(12) United States Patent
Imai et al.

(10) Patent No.: US 10,942,421 B2
(45) Date of Patent: Mar. 9, 2021

(54) BLADE DRIVING DEVICE AND ELECTRONIC DEVICE

(71) Applicant: Nidec Copal Corporation, Tokyo (JP)

(72) Inventors: Kenzo Imai, Tokyo (JP); Daisuke Kakemizu, Tokyo (JP); Taizo Takiguchi, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 16/718,118

(22) Filed: Dec. 17, 2019

(65) Prior Publication Data

US 2020/0201143 A1 Jun. 25, 2020

(30) Foreign Application Priority Data

Dec. 19, 2018 (JP) .............................. JP2018-237107
Dec. 19, 2018 (JP) .............................. JP2018-237304

(51) Int. Cl.
*G03B 11/04* (2006.01)
*G03B 9/36* (2021.01)
*G03B 17/02* (2021.01)

(52) U.S. Cl.
CPC .............. *G03B 11/043* (2013.01); *G03B 9/36* (2013.01); *G03B 17/02* (2013.01); *G03B 2205/0053* (2013.01); *G03B 2217/18* (2013.01)

(58) Field of Classification Search
None
See application file for complete search history.

(56) References Cited

U.S. PATENT DOCUMENTS

| | | | | |
|---|---|---|---|---|
| 6,930,725 | B1* | 8/2005 | Hayashi | F16M 11/10 |
| | | | | 348/207.1 |
| 9,507,241 | B1* | 11/2016 | Schantz | G03B 11/043 |
| 2003/0012570 | A1 | 1/2003 | Yoshida et al. | |
| 2013/0088369 | A1* | 4/2013 | Yu | B60W 40/09 |
| | | | | 340/905 |
| 2018/0059510 | A1* | 3/2018 | Gustaveson, II | G03B 11/04 |
| 2020/0174340 | A1* | 6/2020 | Imai | G03B 9/26 |
| 2020/0177777 | A1* | 6/2020 | Imai | G06F 21/83 |
| 2020/0201143 | A1* | 6/2020 | Imai | G03B 9/36 |

(Continued)

FOREIGN PATENT DOCUMENTS

| | | |
|---|---|---|
| JP | 2000-111989 A | 4/2000 |
| JP | 2001-91993 A | 4/2001 |
| JP | 2001-356387 A | 12/2001 |

(Continued)

*Primary Examiner* — William B Perkey
(74) *Attorney, Agent, or Firm* — Hauptman Ham, LLP

(57) ABSTRACT

A blade driving device includes a blade for covering an opening for an imaging device operable through motor driving and a user manual operation. A blade driving device includes a base with an opening for an imaging device, a movable member movable relative to the base in X-direction and including a slider held on the base and movable in X-direction, a blade connected to the slider, and a knob on a side of the base opposite to the slider and operable to move the blade, a motor that moves the movable member in X-direction until the blade covers or uncovers the opening in the base, and a lead screw and a driving member that transmit rotation of the motor to the slider in the movable member to move the movable member.

18 Claims, 24 Drawing Sheets

(56) References Cited

U.S. PATENT DOCUMENTS

2020/0228688 A1\* 7/2020 Horiuchi .............. G03B 11/043

FOREIGN PATENT DOCUMENTS

| JP | 2006-242994 A | 9/2006 |
|----|---------------|--------|
| JP | 2007-271989 A | 10/2007 |
| JP | 3170619 U | 9/2011 |
| JP | 2014-167559 A | 9/2014 |

\* cited by examiner

BLADE DRIVING DEVICE AND ELECTRONIC DEVICE

RELATED APPLICATIONS

The present application claims priority to Japanese Patent Application Numbers 2018-237304, filed Dec. 19, 2018 and 2018-237107, filed Dec. 19, 2018. The disclosures of the above-listed applications are hereby incorporated by reference herein in their entirety.

BACKGROUND

Technical Field

The present invention relates to a blade driving device and an electronic device, and particularly, to an electronic device including an imaging device.

Description of the Background

Various electronic devices, such as smartphones and drones, nowadays incorporate a camera (imaging device). The camera incorporated in such an electronic device commonly includes a blade that is open and closed as driven by a motor. When the camera is not in use, the blade is closed to prevent external light from entering the image sensor (refer to, for example, Patent Literature 1).

However, if the motor for driving the blade malfunctions or is activated by a third party operation to open the blade, the blade installed inside the electronic device is not directly operable by the user and cannot be closed. In this case, the camera may capture unintended images or videos.

In particular, electronic devices incorporating cameras are often connected to a network such as the Internet. The connected electronic devices may be operated remotely by a malicious program without being noticed by the user. When an electronic device is operated remotely, the blade may be open without being noticed by the user, possibly allowing the camera to capture images or videos for transmission to external devices. For privacy protection of the user, the blade may be directly operable by the user and closed.

CITATION LIST

Patent Literature

Patent Literature 1: Japanese Unexamined Patent Application Publication No. 2006-242994

BRIEF SUMMARY

In response to the above issue, one aspect of the present invention is directed to a blade driving device including a blade for covering an opening for an imaging device that is operable both through driving of a motor and a manual operation of the user.

Another aspect of the present invention is directed to an electronic device that avoids unintended image capturing with an imaging device.

A blade driving device according to a first aspect of the present invention includes a blade for covering an opening for an imaging device that is operable both through driving of a motor and a manual operation of a user. The blade driving device includes a base with an opening for an imaging device, and a movable member movable relative to the base in an opening direction and a closing direction opposite to the opening direction. The movable member includes a slider held on the base in a manner movable in the opening direction and the closing direction, a blade connected to the slider, and an operable member that is located on a side of the base opposite to the slider and is operable to move the blade. The blade driving device includes a motor that moves the movable member in the closing direction until the blade included in the movable member covers the opening in the base, and moves the movable member in the opening direction until the blade included in the movable member uncovers the opening in the base, and a power transmission mechanism that transmits rotation of the motor to the slider included in the movable member to move the movable member.

The blade driving device according to the first aspect of the present invention moves the movable member in the closing direction through driving of the motor and covers the opening in the base with the blade in the movable member, and moves the blade in the movable member in the opening direction through driving of the motor and uncovers the opening in the base. The movable member in the blade driving device also includes the operable member, which allows the user to directly move the blade in the closing direction or the opening direction from outside the blade driving device. The blade for covering the opening for the imaging device can thus be operated both through driving of the motor and a manual operation of the user.

The blade driving device may further include an urging member that urges the movable member in the opening direction when the movable member is located in the opening direction away from an urging reference position, and urges the movable member in the closing direction when the movable member is located in the closing direction away from the urging reference position. The urging member urges the movable member in the opening direction or the closing direction once the user moves the operable member for the movable member in the opening direction or the closing direction and moves the movable member in the opening direction or the closing direction away from the urging reference position. Although the user releases the operable member, the movable member remains moving in the opening direction or the closing direction. This allows an easy operation for the user and facilitates smooth movement of the movable member in the opening or closing direction.

The power transmission mechanism may include a driving member movable in the opening direction and the closing direction, a gear mechanism that transmits rotation of the motor to the driving member to move the driving member, and a first engagement member located on the slider. The first engagement member may engage with the driving member moved in the opening direction by the gear mechanism.

The power transmission mechanism may include a driving member movable in the opening direction and the closing direction, a gear mechanism that transmits rotation of the motor to the driving member to move the driving member, and a second engagement member located on the slider. The second engagement member may engage with the driving member moved in the closing direction by the gear mechanism.

An electronic device according to a second aspect of the present invention avoids unintended image capturing with an imaging device. The electronic device includes an imaging device including an image sensor, and the blade driving device described above. External light enters the image sensor included in the imaging device through the opening in the base included in the blade driving device.

In this structure, the blade included in the blade driving device for covering the opening for the imaging device can be operated both through driving of the motor and a manual operation of the user. If, for example, the motor in the blade driving device malfunctions or is driven by a third party operation and uncovers the opening for the imaging device, the user can directly operate the blade from outside the electronic device and cover the opening for the imaging device with the blade. This prevents unintended image capturing with the imaging device.

An electronic device according to a third aspect of the present invention avoids unintended image capturing with an imaging device. The electronic device includes an imaging device including an image sensor, the blade driving device described above, and a controller that controls driving of the motor included in the blade driving device. External light enters the image sensor included in the imaging device through the opening in the base included in the blade driving device. The blade driving device includes a first sensor that detects the movable member moved by a predetermined distance in the opening direction. The controller rotates the motor included in the blade driving device in a first direction to move the movable member in the opening direction, and stops the rotation of the motor in the first direction in response to the first sensor detecting the movable member moved by the predetermined distance in the opening direction.

In the above structure, as described above, the blade included in the blade driving device for covering the opening for the imaging device can be operated both through driving of the motor and a manual operation of the user, preventing unintended image capturing with the imaging device. The driving of the motor is controlled using a detection signal from the first sensor. The movable member can thus be moved in the opening direction by an intended distance.

An electronic device according to a fourth aspect of the present invention avoids unintended image capturing with an imaging device. The electronic device includes an imaging device including an image sensor, the blade driving device described above, and a controller that controls driving of the motor included in the blade driving device. External light enters the image sensor included in the imaging device through the opening in the base included in the blade driving device. The blade driving device includes a second sensor that detects the movable member moved by a predetermined distance in the closing direction. The controller rotates the motor included in the blade driving device in a second direction to move the movable member in the closing direction, and stops the rotation of the motor in the second direction in response to the second sensor detecting the movable member moved by the predetermined distance in the closing direction.

In the above structure, as described above, the blade included in the blade driving device for covering the opening for the imaging device can be operated both through driving of the motor and a manual operation of the user, preventing unintended image capturing with the imaging device. The driving of the motor is controlled using a detection signal from the second sensor. The movable member can thus be moved in the closing direction by an intended distance.

An electronic device according to a fifth aspect of the present invention avoids unintended image capturing with an imaging device. The electronic device includes an imaging device including an image sensor, the blade driving device described above, and a controller that controls driving of the motor included in the blade driving device. External light enters the image sensor included in the imaging device through the opening in the base included in the blade driving device. The blade driving device includes a first sensor that detects the movable member moved by a predetermined distance in the opening direction, and a third sensor that detects the driving member at a predetermined standby position. The controller rotates the motor included in the blade driving device in a first direction to move the movable member in the opening direction with the driving member, rotates the motor in a second direction opposite to the first direction to move the driving member in the closing direction in response to the first sensor detecting the movable member moved by the predetermined distance in the opening direction, and stops the rotation of the motor in response to the third sensor detecting the driving member at the standby position.

In the above structure, as described above, the blade included in the blade driving device for covering the opening for the imaging device can be operated both through driving of the motor and a manual operation of the user, preventing unintended image capturing with the imaging device. The driving of the motor is controlled using a detection signal from the first sensor. The movable member can thus be moved in the opening direction by an intended distance. The driving of the motor is also controlled using a detection signal from the third sensor. The driving member can thus be returned to an intended standby position after the movable member is moved in the opening direction by an intended distance.

An electronic device according to a sixth aspect of the present invention avoids unintended image capturing with an imaging device. The electronic device includes an imaging device including an image sensor, the blade driving device described above, and a controller that controls driving of the motor included in the blade driving device. External light enters the image sensor included in the imaging device through the opening in the base included in the blade driving device. The blade driving device includes a second sensor that detects the movable member moved by a predetermined distance in the closing direction, and a third sensor that detects the driving member at a predetermined standby position. The controller rotates the motor included in the blade driving device in a second direction to move the movable member in the closing direction with the driving member, rotates the motor in a first direction opposite to the second direction to move the driving member in the opening direction in response to the second sensor detecting the movable member moved by the predetermined distance in the closing direction, and stops the rotation of the motor in response to the third sensor detecting the driving member at the standby position.

In the above structure, as described above, the blade included in the blade driving device for covering the opening for the imaging device can be operated both through driving of the motor and a manual operation of the user, preventing unintended image capturing with the imaging device. The driving of the motor is controlled using a detection signal from the second sensor. The movable member can thus be moved in the closing direction by an intended distance. The driving of the motor is also controlled using a detection signal from the third sensor. The driving member can thus be returned to an intended standby position after the movable member is moved in the closing direction by an intended distance.

A blade driving device according to a seventh aspect of the present invention includes a blade for covering an opening for an imaging device that is operable both through driving of the motor and a manual operation of the user. The blade driving device includes a base with an opening for an imaging device, and a movable member movable relative to the base in an opening direction and a closing direction opposite to the opening direction. The movable member includes a slider held on the base in a manner movable in the opening direction and the closing direction, a blade connected to the slider, and an operable member that is located on a side of the base opposite to the slider and is operable to move the blade. The blade driving device includes a motor that moves the movable member in the closing direction until the blade included in the movable member covers the opening in the base, and moves the movable member in the opening direction until the blade included in the movable member uncovers the opening in the base, a gear mechanism in engagement with the slider included in the movable member to transmit rotation of the motor to the movable member, and an urging member that urges the movable member in the opening direction when the movable member is located in the opening direction away from an urging reference position, and urges the movable member in the closing direction when the movable member is located in the closing direction away from the urging reference position.

The blade driving device according to the seventh aspect of the present invention moves the movable member in the closing direction through driving of the motor and covers the opening in the base with the blade in the movable member, and moves the movable member in the opening direction through driving of the motor and uncovers the opening in the base with the blade. The movable member in the blade driving device also includes the operable member, which allows the user to directly move the blade in the closing direction or the opening direction from outside the blade driving device. The blade for covering the opening for the imaging device can thus be operated both through driving of the motor and a manual operation of the user.

The urging member urges the movable member in the opening direction or the closing direction once the user moves the operable member for the movable member in the opening direction or the closing direction and moves the movable member in the opening direction or the closing direction away from the urging reference position. This reduces a force to be applied onto the operable member by the user, allows an easy operation for the user, and facilitates smooth movement of the movable member in the opening or closing direction.

The motor may include a motor shaft extending in the opening direction or the closing direction. In this case, the gear mechanism may include a bevel gear that translates rotation of the motor into motion in the opening direction or the closing direction. The gear mechanism may include a gear that reduces a rotation speed of the motor.

An electronic device according to an eighth aspect of the present invention avoids unintended image capturing with an imaging device. The electronic device includes an imaging device including an image sensor, the blade driving device described above, and a controller that controls driving of the motor included in the blade driving device. External light enters the image sensor included in the imaging device through the opening in the base included in the blade driving device.

In the above structure, the blade included in the blade driving device for covering the opening for the imaging device can be operated both through driving of the motor and a manual operation of the user. If, for example, the motor in the blade driving device malfunctions or is driven by a third party operation and uncovers the opening for the imaging device, the user can directly operate the blade from outside the electronic device and cover the opening for the imaging device with the blade. This prevents unintended image capturing with the imaging device.

The blade driving device may include a first sensor that detects the movable member moved by a predetermined distance in the opening direction. In this case, the controller may rotate the motor included in the blade driving device in a first direction to move the movable member in the opening direction, and stop the rotation of the motor in the first direction in response to the first sensor detecting the movable member moved by the predetermined distance in the opening direction. In the above structure, the driving of the motor is controlled using a detection signal from the first sensor. The movable member can thus be moved in the opening direction by an intended distance.

The blade driving device may include a second sensor that detects the movable member moved by a predetermined distance in the closing direction. In this case, the controller may rotate the motor included in the blade driving device in a second direction to move the movable member in the closing direction, and stop the rotation of the motor in the second direction in response to the second sensor detecting the movable member moved by the predetermined distance in the closing direction. In the above structure, the driving of the motor is controlled using a detection signal from the second sensor. The movable member can thus be moved in the closing direction by an intended distance.

The electronic device described above may further include a communication interface for connection to a network. When the electronic device is connected to a network through the communication interface, the connected electronic device may be operated remotely by a malicious program without being noticed by the user. As described above, the electronic device according to any one of the above aspects of the present invention allows the user to directly operate the blade from outside the electronic device and cover the opening for the imaging device with the blade for privacy protection of the user.

In the aspects of the present invention, the blade included in the blade driving device for covering the opening for the imaging device can be operated both through driving of the motor and a manual operation of the user, thus preventing unintended image capturing with the imaging device.

DETAILED DESCRIPTION

First Embodiment

Figure 1:
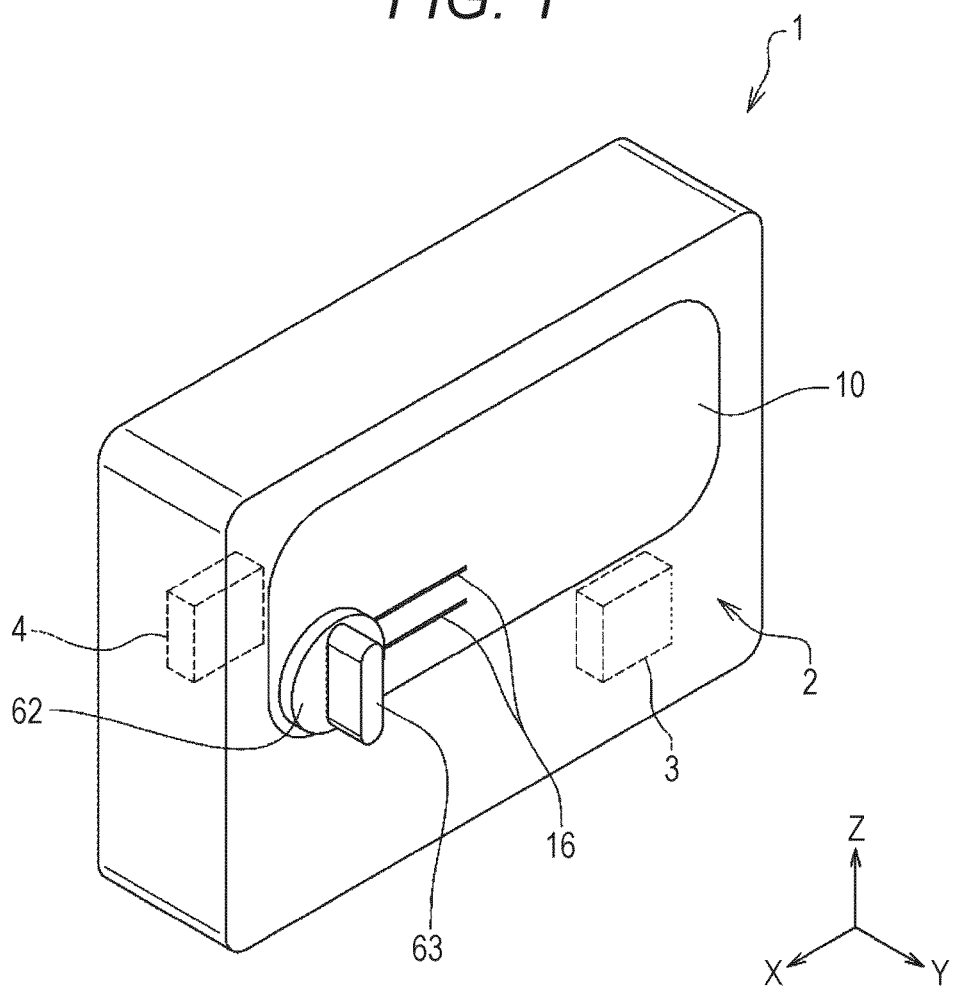
FIG. 1 is a perspective view of an electronic device according to one embodiment of the present invention.

An electronic device according to a first embodiment of the present invention will now be described in detail with reference to FIGS. 1 to 17B. In FIGS. 1 to 17B, the same or corresponding components are given the same reference numerals, and will not be described repeatedly. In FIGS. 1 to 17B, the scale and dimensions of each component may be exaggerated, or one or more components may not be shown.

FIG. 1 is a perspective view of an electronic device 1 according to one embodiment of the present invention. The electronic device 1 is a network device incorporating a communication interface (not shown), through which the electronic device 1 is connectable to a network, such as the Internet. The electronic device 1 also incorporates an imaging device 4. Examples of the electronic device 1 include a smartphone, a tablet, a computer, a security camera, a drone, and a smart speaker.

As shown in FIG. 1, the electronic device 1 includes the imaging device 4, a blade driving device 2 for blocking light entering an image sensor (not shown) in the imaging device 4, and a controller 3 for controlling the operation of the blade driving device 2. In the present embodiment, for ease of explanation, the positive Z-direction in FIG. 1 is referred to as up or upward, the negative Z-direction is referred to as down or downward, the positive Y-direction is referred to as front or frontward, and the negative Y-direction is referred to as back or backward.

Figure 2:
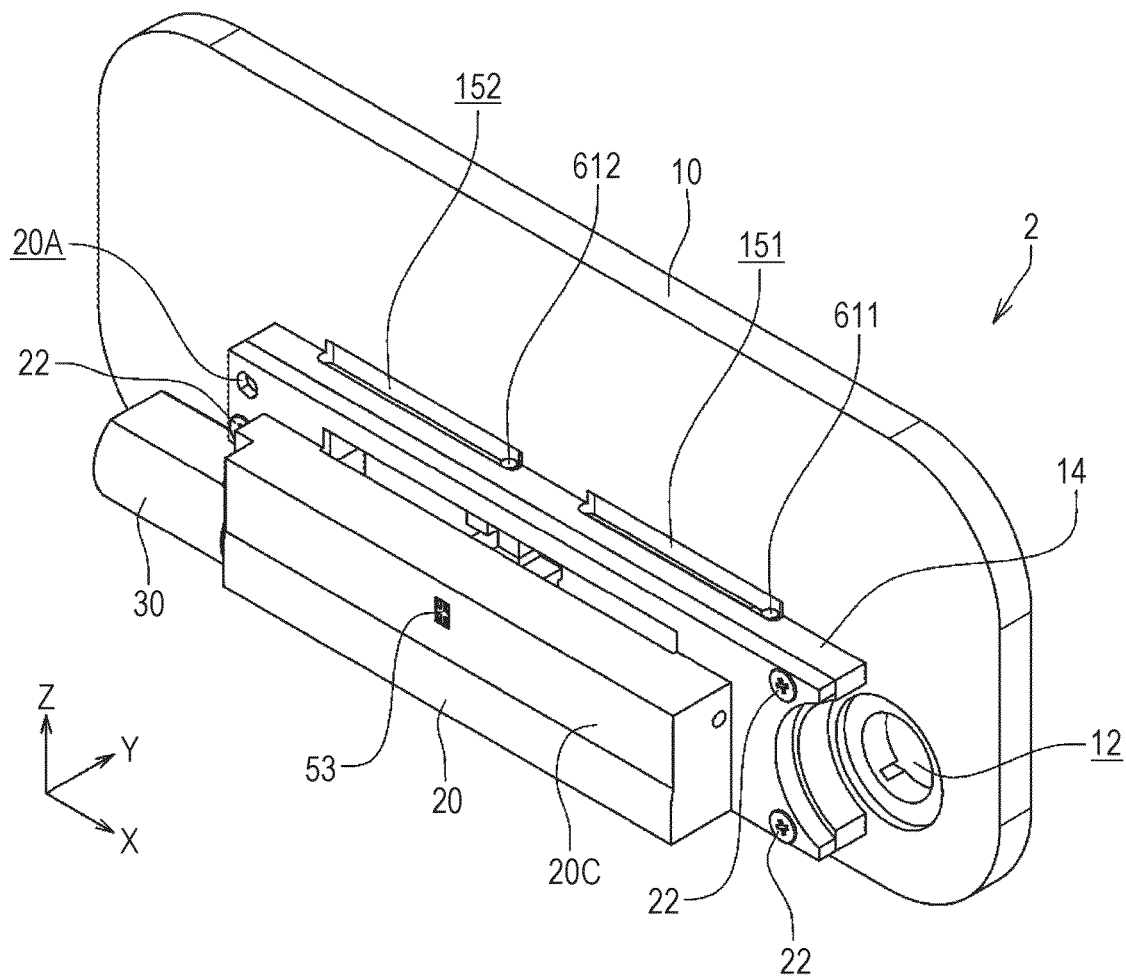
FIG. 2 is a back perspective view of a blade driving device included in the electronic device in FIG. 1.
Figure 3:
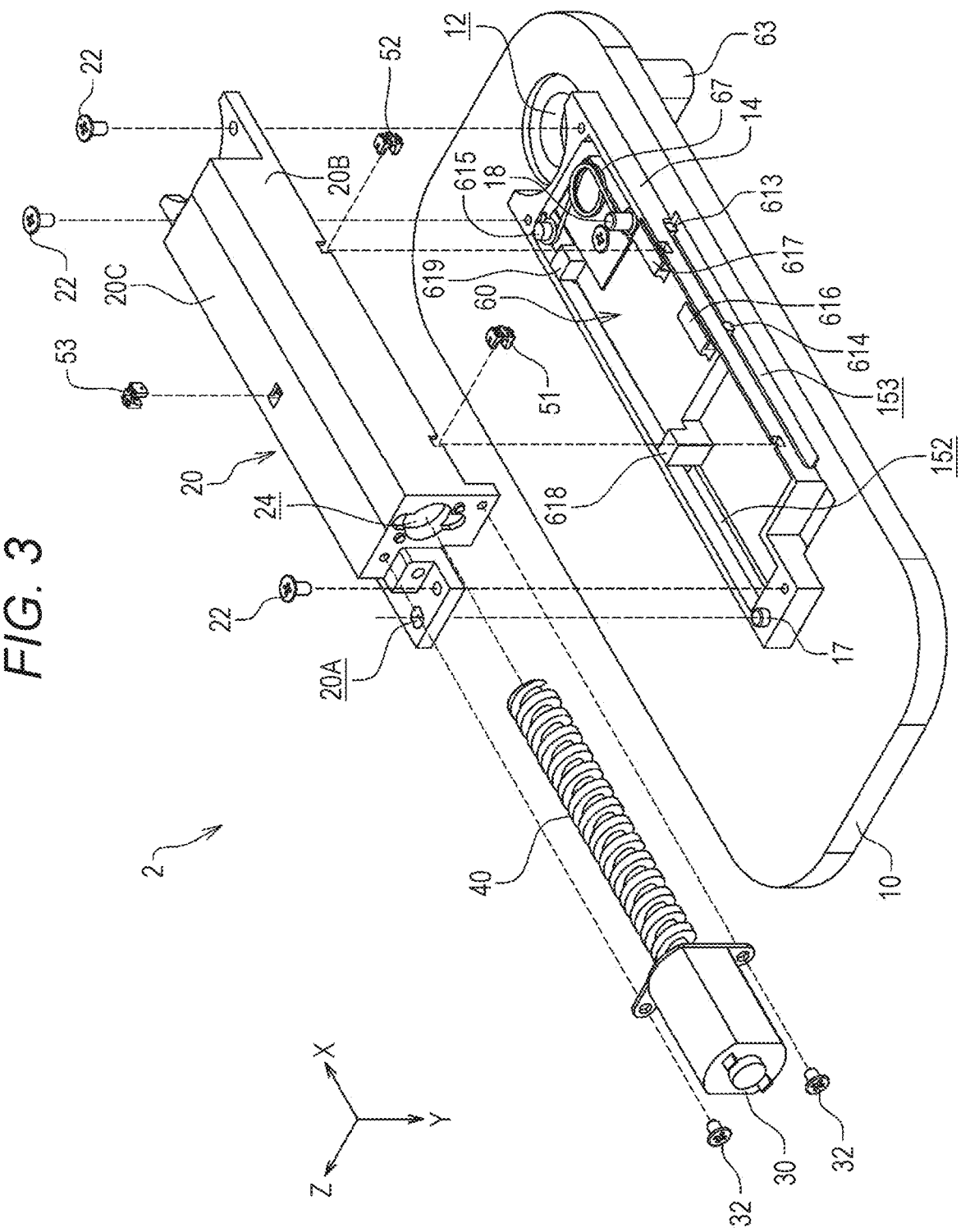
FIG. 3 is an exploded perspective view of the blade driving device in FIG. 2.

FIG. 2 is a back perspective view of the blade driving device 2. FIG. 3 is an exploded perspective view of the blade driving device 2 in FIG. 2. As shown in FIGS. 2 and 3, the blade driving device 2 includes a substantially rectangular plate-like base 10, a casing 20 attached to the back face of the base 10, a motor 30 attached to the casing 20, and a lead screw 40 mounted on the motor shaft of the motor 30. The base 10 in the present embodiment has a circular opening 12. The center axis of the opening 12 is substantially aligned with the optical axis of the imaging device 4. Light external to the electronic device 1 enters the image sensor in the imaging device 4 incorporated in the electronic device 1 through the opening 12.

Figure 4:
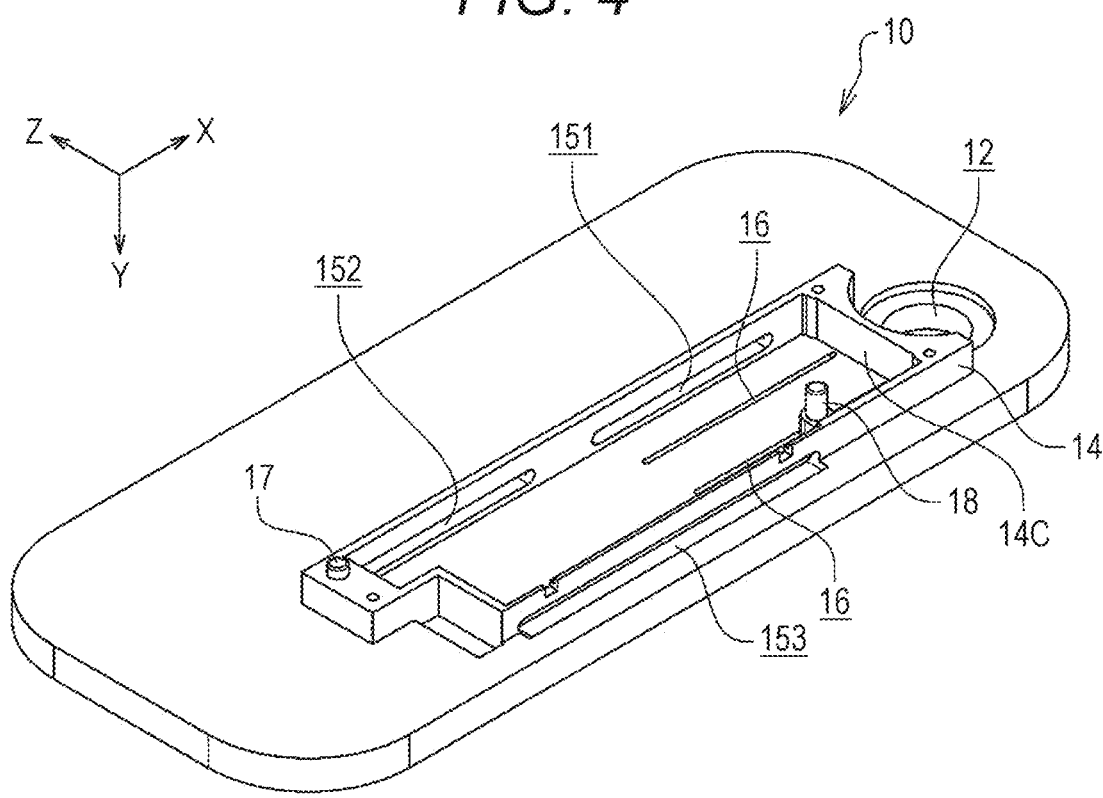
FIG. 4 is a perspective view of a base included in the blade driving device in FIG. 2.
Figure 5:
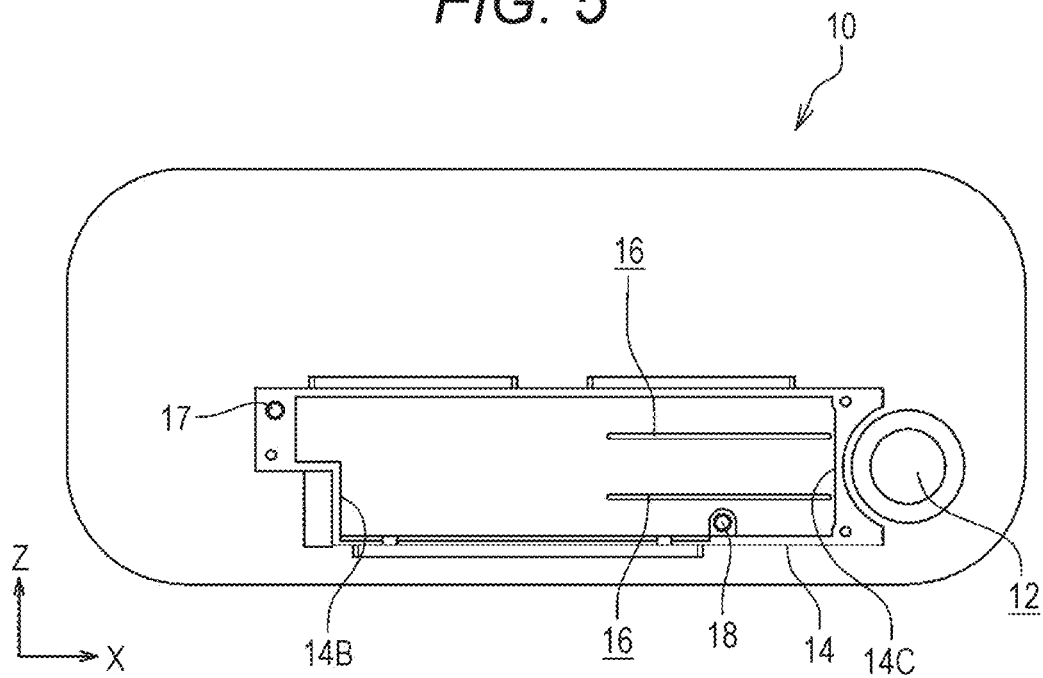
FIG. 5 is a back view of the base in FIG. 4.

FIG. 4 is a perspective view of the base 10. FIG. 5 is a back view of the base 10. As shown in FIGS. 4 and 5, the back face of the base 10 includes a frame 14 protruding in the negative Y-direction. The frame 14 has protrusions 17 and 18 protruding in the negative Y-direction. As shown in FIG. 3, the frame 14 receives the casing 20 attached with screws 22. The protrusion 17 on the frame 14 engages with a positioning hole 20A in the casing 20 to position the frame 14 and the casing 20 on the XZ plane.

As shown in FIG. 3, a first sensor 51 and a second sensor 52 are located between a side wall 20B of the casing 20 in the negative Z-direction and the frame 14 included in the base 10. A third sensor 53 is embedded in a side wall 20C of the casing 20 in the negative Y-direction. The sensors 51 to 53 are connected to the controller 3 (refer to FIG. 1) with signal lines (not shown). The sensors 51 to 53 output signals, which are input to the controller 3. The sensors 51 to 53 may be any sensors that detect a detection target. Examples of the sensors 51 to 53 include optical sensors and proximity sensors (operating with, for example, an eddy current, capacitance, or a magnetic force).

The motor 30 is attached to the casing 20 with screws 32. The motor 30 is connected to the controller 3 (refer to FIG. 1) with a signal line (not shown) and driven in response to a signal from the controller 3. As shown in FIG. 3, the lead screw 40 connected to the motor 30 is received in the casing 20 through an opening 24 in the casing 20. The casing 20 accommodates a movable member 60 that is movable in X-direction relative to the base 10.

Figure 6:
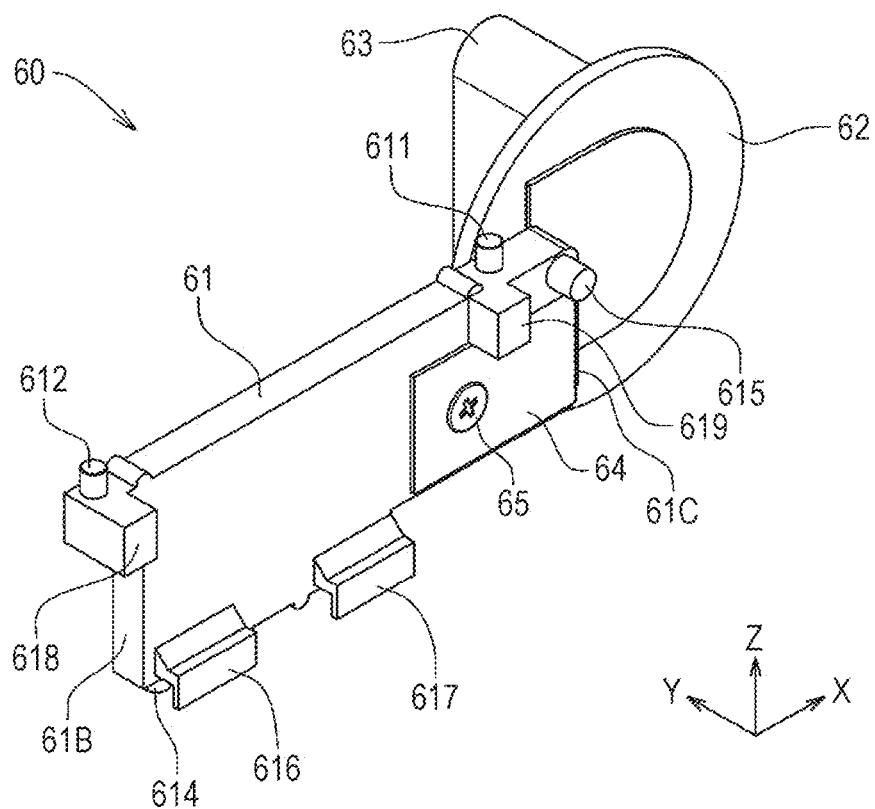
FIG. 6 is a perspective view of a movable member included in the blade driving device in FIG. 2.
Figure 7:
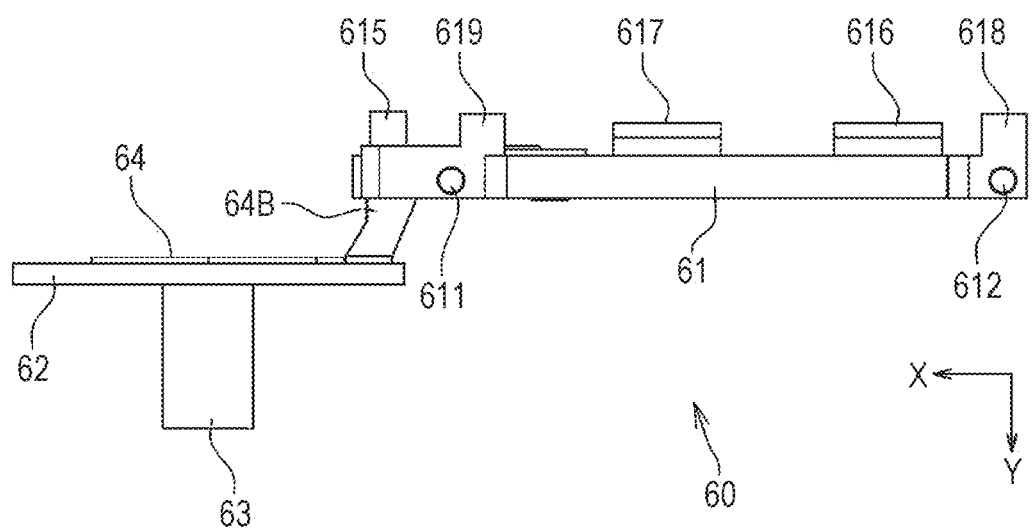
FIG. 7 is a plan view of the movable member in FIG. 6.
Figure 8:
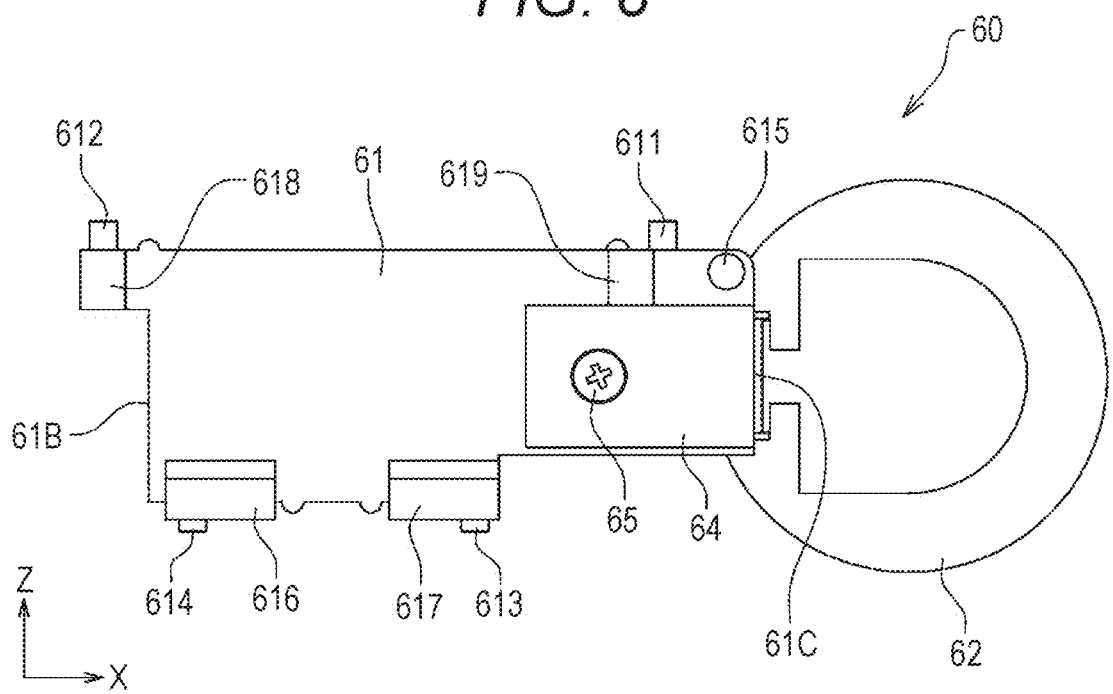
FIG. 8 is a back view of the movable member in FIG. 6.
Figure 9:
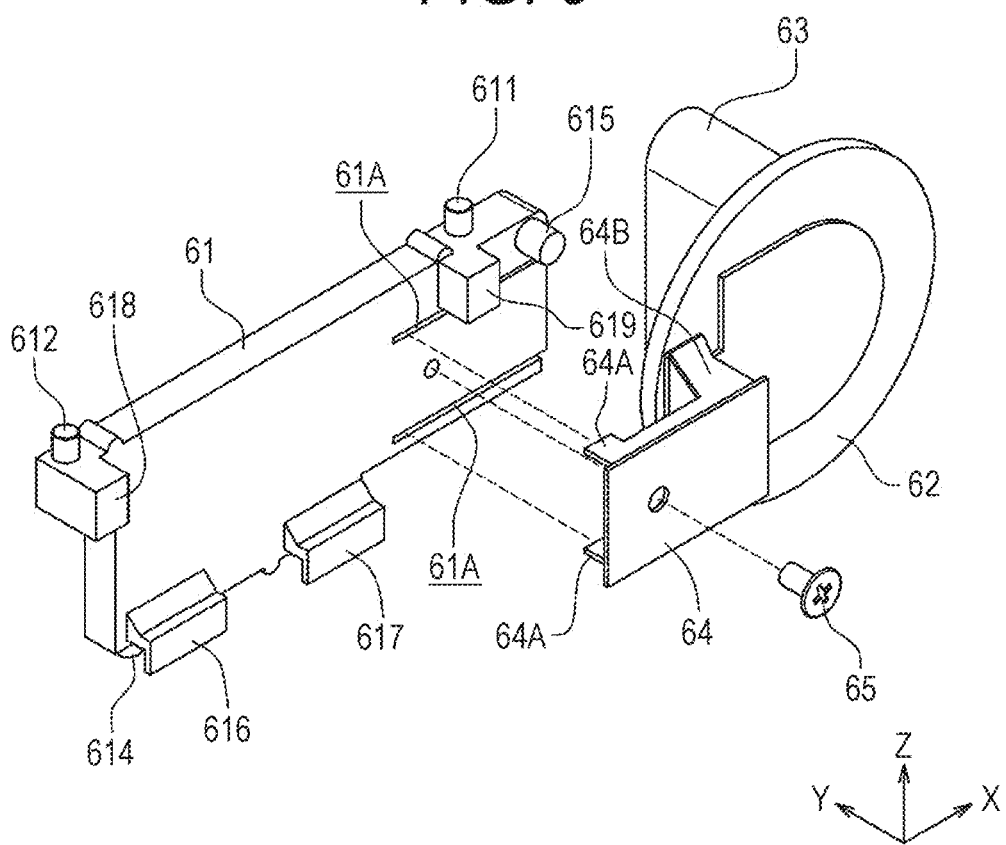
FIG. 9 is an exploded perspective view of the movable member in FIG. 6.

FIG. 6 is a perspective view of the movable member 60. FIG. 7 is a plan view of the movable member 60. FIG. 8 is a back view of the movable member 60. FIG. 9 is an exploded perspective view of the movable member 60. As shown in FIGS. 6 to 9, the movable member 60 includes a substantially rectangular plate-like slider 61, a substantially disk-shaped blade 62, a knob 63 extending in the positive Y-direction from the blade 62, and a connector 64 connecting the blade 62 and the slider 61. The connector 64 is fixed to the blade 62 with, for example, an adhesive, and also to the slider 61 with a screw 65. As shown in FIG. 9, the slider 61 has two grooves 61A for receiving legs 64A of the connector 64. When the connector 64 is attached to the slider 61, the legs 64A of the connector 64 are fitted in the grooves 61A on the slider 61.

As shown in FIGS. 6 to 9, the slider 61 includes cylindrical guides 611 and 612 protruding in the positive Z-direction, cylindrical guides 613 and 614 protruding in the negative Z-direction, and a protrusion 615 extending in the negative Y-direction. The slider 61 also includes a first detectable piece 616 detectable by the first sensor 51 and a second detectable piece 617 detectable by the second sensor 52 near its edge in the negative Z-direction. In the present embodiment, the first detectable piece 616 on the slider 61 can move through a groove in the first sensor 51. The first sensor 51 detects the position of the slider 61 by detecting the first detectable piece 616 on the slider 61 within the groove. In the same manner, the second detectable piece 617 on the slider 61 can move through a groove in the second sensor 52. The second sensor 52 detects the position of the slider 61 by detecting the second detectable piece 617 on the slider 61 within the groove.

As shown in FIGS. 6 to 9, the slider 61 further includes a first engagement member 618 and a second engagement member 619 protruding in the negative Y-direction, with the first engagement member 618 located in the negative X-direction and the second engagement member 619 located in the positive X-direction.

Referring back to FIG. 4, the base 10 has guide grooves 151, 152, and 153 extending in X-direction on side surfaces of the frame 14. The guide grooves 151 and 152 on the base 10 receive the guides 611 and 612 on the slider 61. The guide groove 153 receives the guides 613 and 614 on the slider 61. The guide 611 on the slider 61 is movable in X-direction within the guide groove 151 on the base 10. The guide 612 on the slider 61 is movable in X-direction within the guide groove 152 on the base 10. The guides 613 and 614 on the slider 61 are movable in X-direction within the guide groove 153 on the base 10. The slider 61 is thus movable in X-direction within the frame 14 included in the base 10.

As shown in FIGS. 4 and 5, the base 10 has two slots 16 extending in X-direction inside the frame 14. The slots 16 extend through the base 10. The slots 16 receive intermediate members 64B (refer to FIGS. 7 and 9) of the connector 64 included in the movable member 60. In the above structure, the blade 62 connected to the connector 64 and the knob 63 on the blade 62 are located on the side of the base 10 opposite to the slider 61 (in front of the base 10). The movable member 60 is thus movable in X-direction with the blade 62 and the knob 63 located in front of the base 10. In the present embodiment, the front face of the base 10 forms a portion of the front face of the electronic device 1 as shown in FIG. 1.

As shown in FIG. 3, the casing 20 accommodates a torsion spring 67. The torsion spring 67 has one end engaging with the protrusion 615 on the slider 61 and the other end engaging with the protrusion 18 on the frame 14 in the base 10. The torsion spring 67 urges the slider 61 (the movable member 60) in X-direction (the positive X-direction or the negative X-direction) relative to the base 10. As described later, the direction in which the torsion spring 67 urges the movable member 60 is changed in accordance with the position of the slider 61. In FIG. 3, the torsion spring 67 urges the movable member 60 in the positive X-direction.

Figure 10:
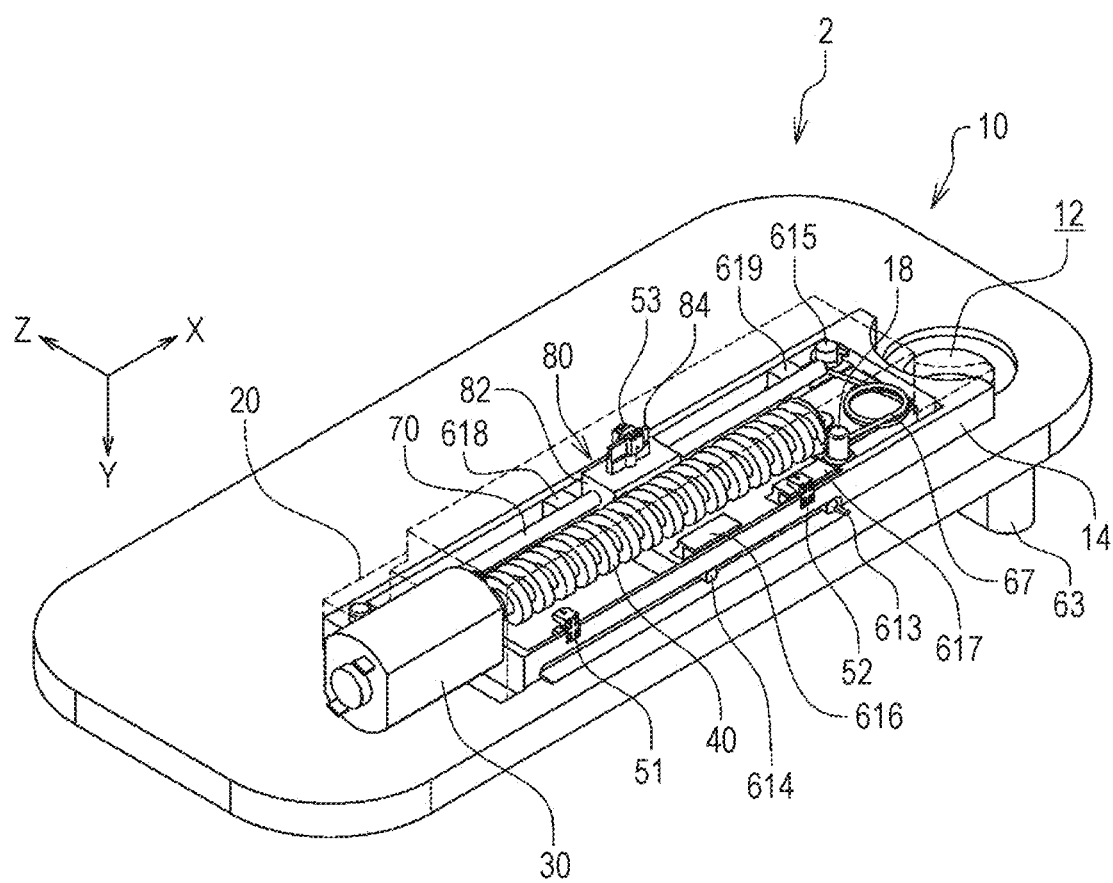
FIG. 10 is a perspective view of the blade driving device in FIG. 2 as viewed through a casing.

FIG. 10 is a perspective view of the blade driving device 2 as viewed through the casing 20. As shown in FIG. 10, the casing 20 accommodates a guide shaft 70 extending in X-direction. A driving member 80 is mounted on the guide shaft 70 in a manner movable in X-direction.

Figure 11A:
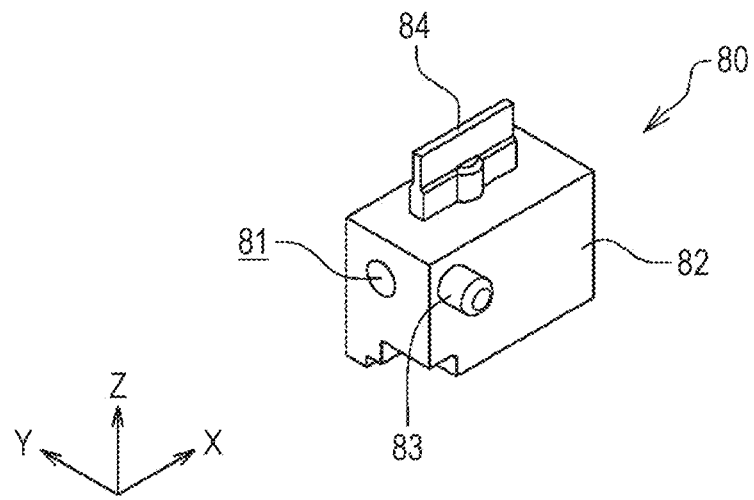
FIG. 11A is a back perspective view of a driving member included in the blade driving device in FIG. 10.
Figure 11B:
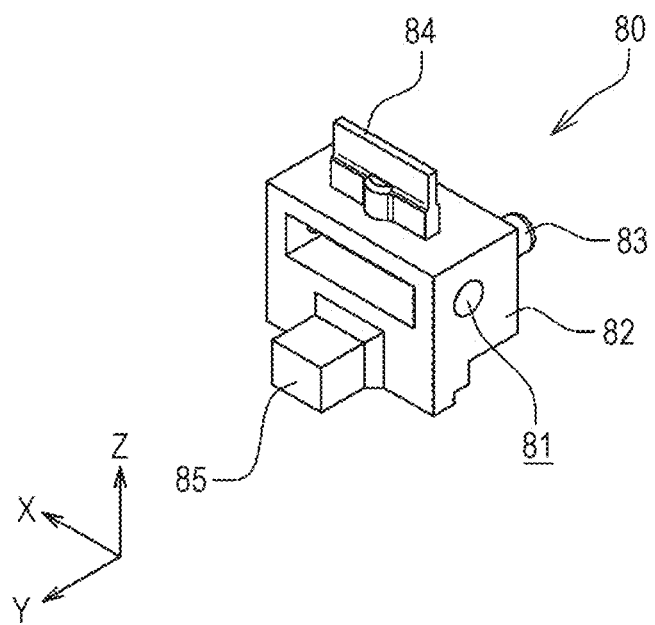
FIG. 11B is a front perspective view of the driving member included in the blade driving device in FIG. 10.

FIG. 11A is a back perspective view of the driving member 80. FIG. 11B is a front perspective view of the driving member 80. As shown in FIGS. 11A and 11B, the driving member 80 includes a body 82 with an insertion hole 81 through which the guide shaft 70 extends, a protrusion 83 protruding in the negative Y-direction from the body 82, a third detectable piece 84 extending in the positive Z-direction from the body 82 and detectable by the third sensor 53, and a driving piece 85 extending in the positive Y-direction from the body 82. The driving member 80 has the protrusion 83 engaging with the lead screw 40. Thus, as the lead screw 40 rotates, the driving member 80 receives a force in X-direction generated by the lead screw 40 and moves in X-direction. The third detectable piece 84 on the driving member 80 can move through a groove in the third sensor 53. The third sensor 53 detects the position of the driving member 80 by detecting the third detectable piece 84 on the driving member 80 within the groove.

The driving piece 85 on the driving member 80 engages with the first engagement member 618 on the movable member 60 when the driving member 80 moves in the negative X-direction, and engages with the second engagement member 619 on the movable member 60 when the driving member 80 moves in the positive X-direction. This will be described in detail later.

Figure 12A:
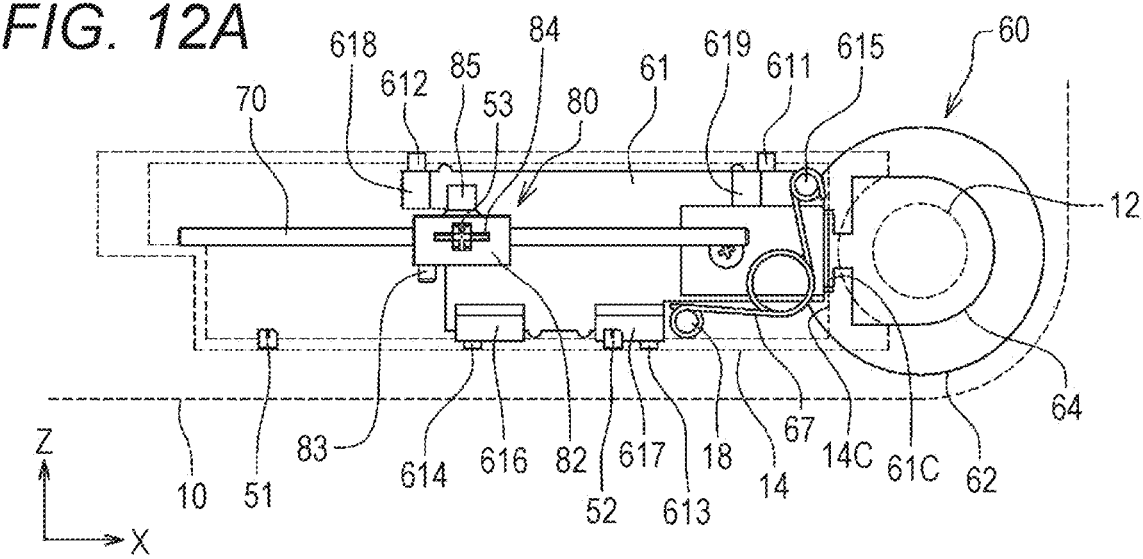
FIG. 12A is a partial back view of the blade driving device in the state shown in FIG. 2.

FIG. 12A is a partial back view of the blade driving device 2 in the state shown in FIG. 2. In FIG. 12A, the blade 62 included in the movable member 60 overlaps and covers the opening 12 in the base 10. This state is referred to as a closed state of the blade driving device 2. In the closed state, the opening 12 in the base 10 is located between the blade 62 in the movable member 60 and the image sensor included in the imaging device 4. The blade 62 in the movable member 60 is exposed outside the electronic device 1. The user can thus operate the exposed blade 62 as appropriate.

The blade 62 in the movable member 60 can block light external to the electronic device 1 from entering the image sensor in the imaging device 4 incorporated in the electronic device 1 in a given manner. For example, the blade 62 may include a shield plate that completely blocks external light, a ground glass plate that scatters light, or a filter that selectively transmits light of a predetermined wavelength. In the present embodiment, the blade 62 includes a shield plate that completely blocks external light. Thus, light external to the electronic device 1 is blocked at the blade 62 and does not enter the image sensor in the imaging device 4 incorporated in the electronic device 1. For example, when the imaging device 4 incorporated in the electronic device 1 is not in use, the blade driving device 2 in the closed state prevents external light from entering the image sensor in the imaging device 4 incorporated in the electronic device 1.

The blade 62 in the movable member 60 can be manually moved in the negative X-direction when the blade driving device 2 is in the closed state. More specifically, the user can move the blade 62 (movable member 60) in the negative X-direction by holding and moving the knob 63 (refer to FIG. 1) for the movable member 60 located on the front face of the electronic device 1 in the negative X-direction.

Figure 12B:
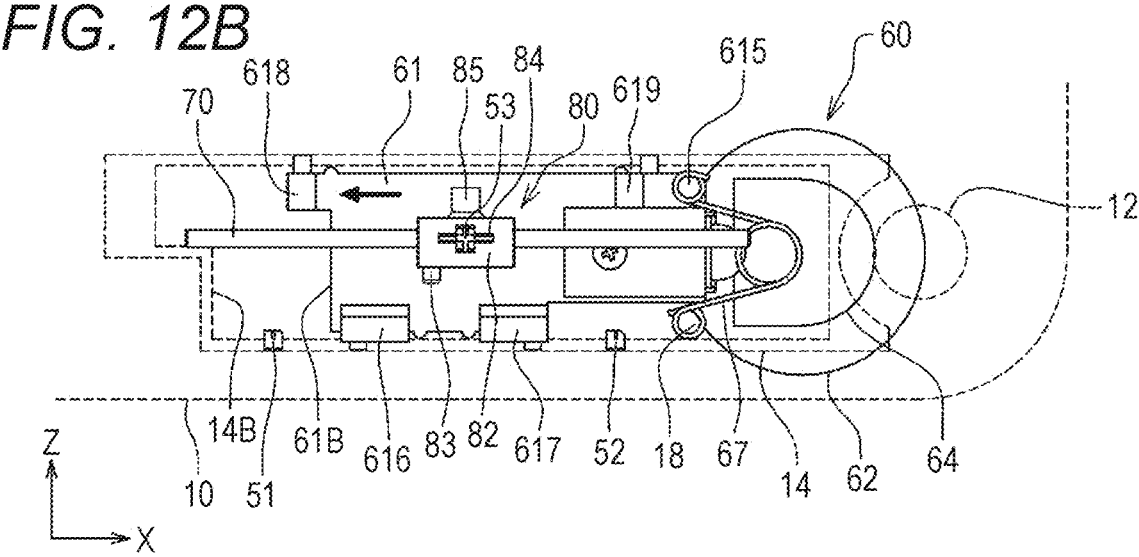
FIG. 12B is a partial back view of the blade driving device with the movable member moved in an opening direction from the closed state shown in FIG. 12A.

In the closed state of the blade driving device 2 as in FIG. 12A, the torsion spring 67 urges the movable member 60 in the positive X-direction. Once the movable member 60 is moved until the protrusion 615 on the slider 61 is located in the negative X-direction away from the protrusion 18 on the frame 14 included in the base 10, the torsion spring 67 changes the direction of urging the movable member 60 to the negative X-direction. In FIG. 12B, the movable member 60 is moved in the negative X-direction away from the position shown in FIG. 12A. The protrusion 615 on the slider 61 included in the movable member 60 is aligned with the protrusion 18 on the frame 14 included in the base 10 in X-direction (the position of the movable member 60 in this state is referred to as an urging reference position). The direction in which the movable member 60 is urged by the torsion spring 67 is reversed in accordance with the position of the movable member 60 either in the positive X-direction or in the negative X-direction away from the urging reference position. More specifically, when the movable member 60 is located in the positive X-direction away from the urging reference position, the torsion spring 67 urges the movable member 60 in the positive X-direction. When the movable member 60 is located in the negative X-direction away from the urging reference position, the torsion spring 67 urges the movable member 60 in the negative X-direction.

As described above, the torsion spring 67 in the present embodiment urges the movable member 60 in the negative X-direction when the movable member 60 is located in the negative X-direction away from the urging reference position, and in the positive X-direction when the movable member 60 is located in the positive X-direction away from the urging reference position. Such an urging member allows an easy operation for the user as described below and facilitates smooth movement of the movable member in the opening or closing direction. The urging member is not limited to the illustrated torsion spring 67.

The torsion spring 67 as the urging member urges the movable member 60 in the negative X-direction once the user moves the movable member 60 in the negative X-direction away from the urging reference position with the knob 63 for the movable member 60. Although the user releases the knob 63, the movable member 60 remains moving in the negative X-direction until the end face 61B of the slider 61 (refer to FIG. 6) eventually comes in contact with the side surface 14B of the frame 14 in the base 10 (refer to FIG. 5) as in FIG. 12C. In this state, the blade 62 in the movable member 60 is apart from the opening 12 in the base 10, uncovering the opening 12 in the base 10.

Figure 12C:
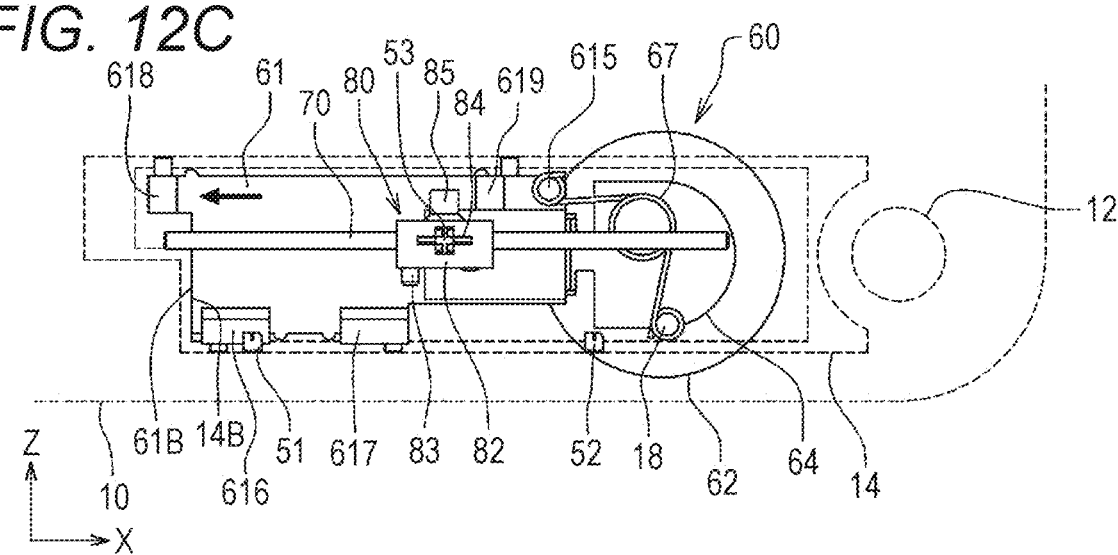
FIG. 12C is a partial back view of the blade driving device with the movable member moved in the opening direction from the state shown in FIG. 12B under an urging force of a torsion spring.

In the state shown in FIG. 12C, the user can move the blade 62 (movable member 60) in the positive X-direction by holding and moving the knob 63 for the movable member 60 in the positive X-direction. Once the movable member 60 is moved in the positive X-direction away from the urging reference position, the torsion spring 67 urges the movable member 60 in the positive X-direction. Thus, although the user releases the knob 63, the movable member 60 remains moving in the positive X-direction until the end face 61C of the slider 61 (refer to FIG. 6) comes in contact with the side surface 14C of the frame 14 in the base 10 (refer to FIG. 4) as in FIG. 12A. In this state, the blade 62 in the movable member 60 is aligned with the opening 12 in the base 10, covering the opening 12 in the base 10.

As described above, the knob 63 for the movable member 60 in the present embodiment functions as an operable member that is located on the side of the base 10 opposite to the slider 61 and is operable to move the blade 62. The blade driving device 2 in the present embodiment with such an operable member allows the user to directly move the blade from outside the electronic device 1 with the operable member. The operable member is not limited to the illustrated knob 63, and may be, for example, a recess on the surface of the blade 62.

Figure 13:
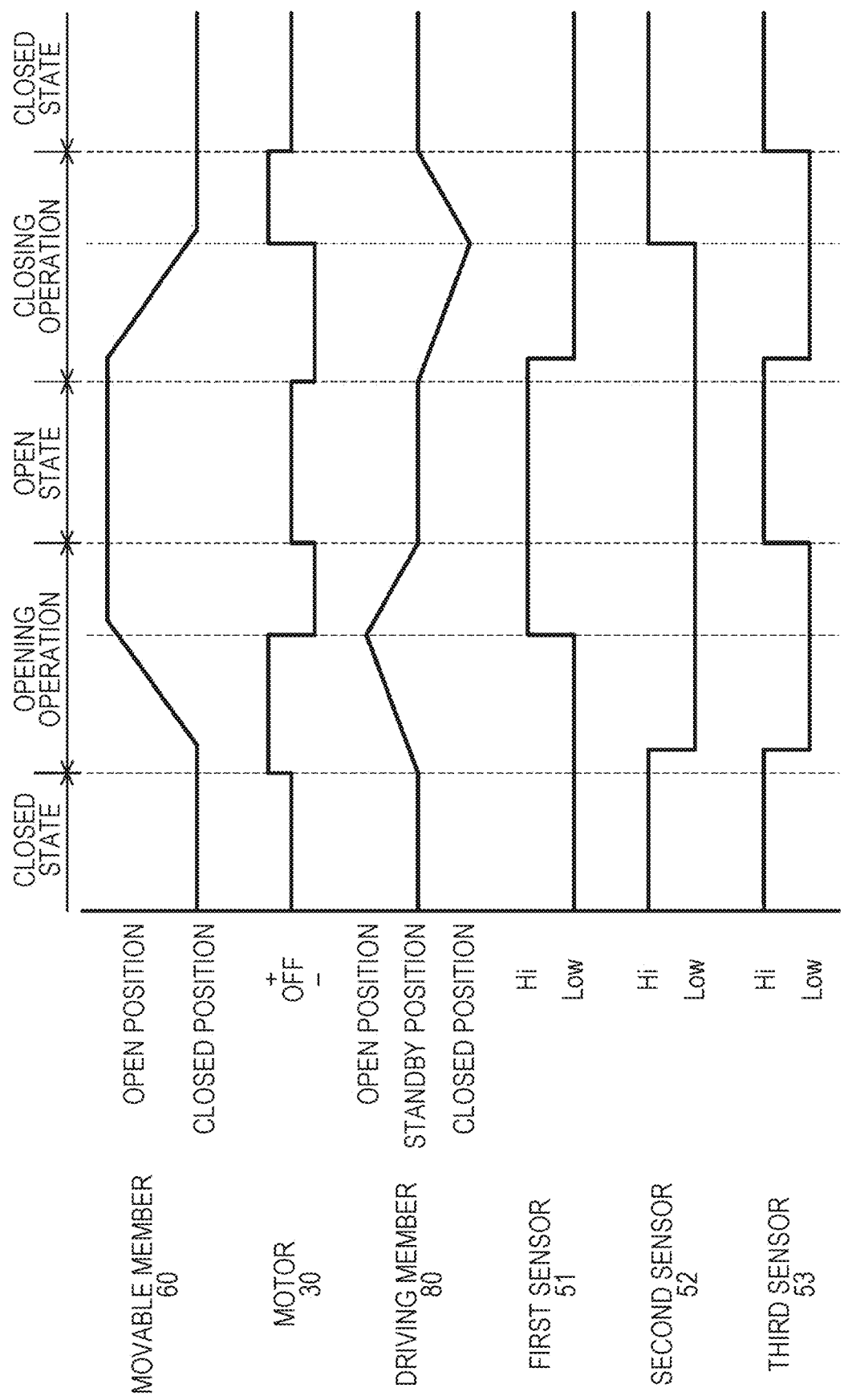
FIG. 13 is a timing chart of a control sequence of a motor driven in the blade driving device shown in FIG. 2 to move the movable member.

The blade 62 in the movable member 60 may also be moved in X-direction through driving of the motor 30. FIG. 13 is a timing chart of a control sequence of the motor 30 driven to move the blade 62 in the movable member 60 in X-direction.

Figure 14:
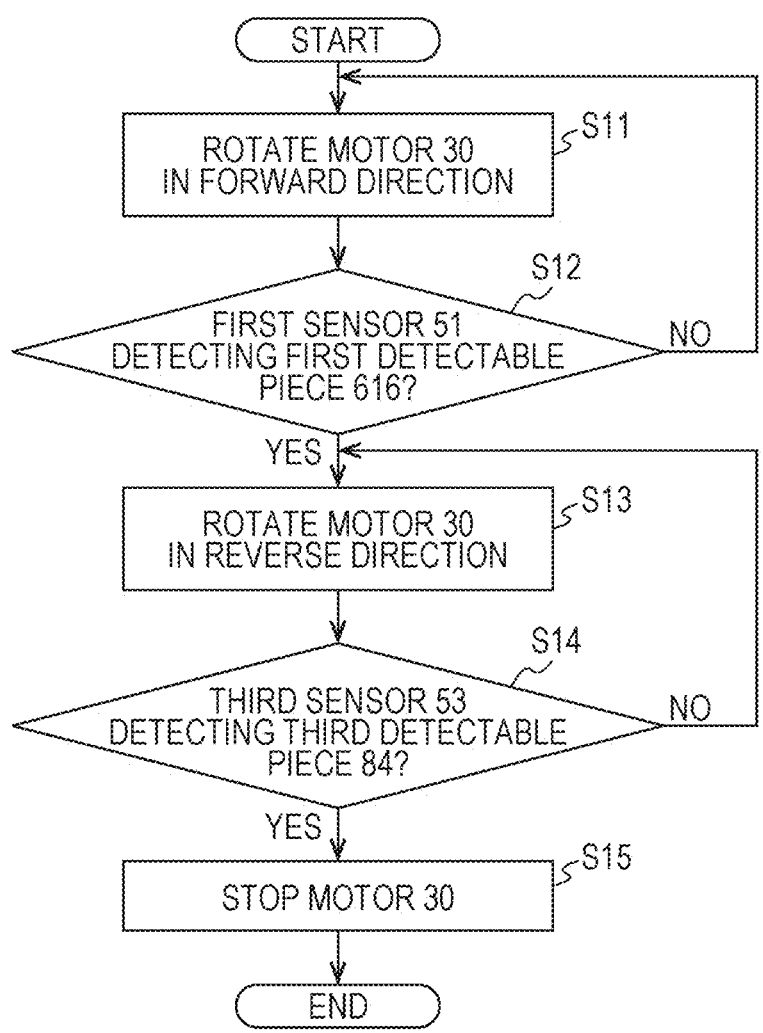
FIG. 14 is a flowchart showing control of the motor driven in the blade driving device shown in FIG. 2 for moving the movable member in the opening direction.

For example, when the blade driving device 2 is in the closed state as in FIG. 12A, the motor 30 may be driven to move the movable member 60 in the negative X-direction and uncover the opening 12 in the base 10. FIG. 14 is a flowchart showing the control of the motor 30 during the movement. The control will now be described in more detail.

The controller 3 first transmits a drive signal to the motor 30, and applies, for example, a positive voltage to the motor 30 to rotate the motor 30 in the forward direction (first direction) (step S11). This also rotates the lead screw 40 in the forward direction. The lead screw 40 in engagement with the protrusion 83 on the driving member 80 moves the driving member 80 in the negative X-direction (opening direction) along the guide shaft 70. The movable member 60 (slider 61) urged in the positive X-direction by the torsion spring 67 remains stationary.

During the movement, the controller 3 monitors the first sensor 51 for detecting the first detectable piece 616 on the slider 61 (step S12). In the present embodiment, the first sensor 51 detects the movable member 60 moved by a predetermined distance from the urging reference position shown in FIG. 12B in the negative X-direction. In FIG. 12B, the first sensor 51 is located in the negative X-direction away from the first detectable piece 616 on the slider 61. Thus, when the first sensor 51 has not detected the first detectable piece 616 on the slider 61, the controller 3 determines that the movable member 60 has not moved by a predetermined distance in the negative X-direction, and keeps the motor 30 rotating in the forward direction.

Figure 15A:
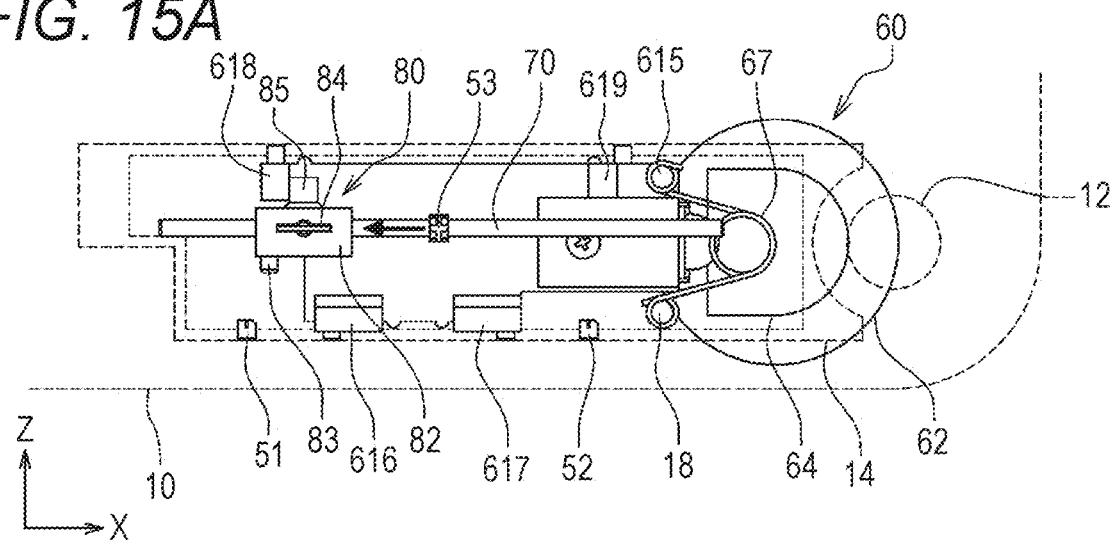
FIG. 15A is a partial back view of the blade driving device with the movable member moved in the opening direction from the closed state shown in FIG. 12A through driving of the motor.
Figure 15B:
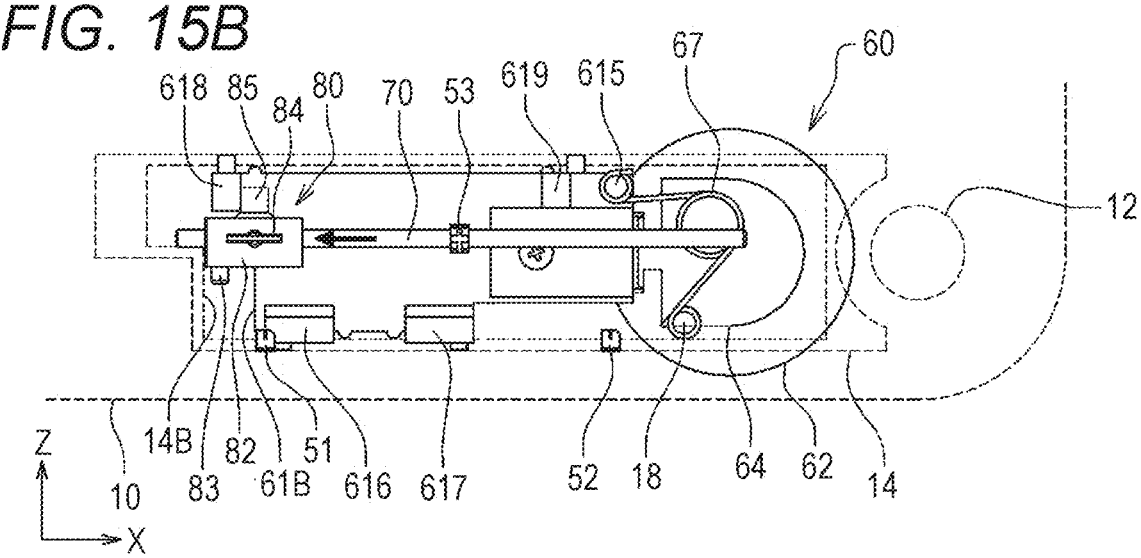
FIG. 15B is a partial back view of the blade driving device with the movable member further moved in the opening direction from the state shown in FIG. 15A through driving of the motor.
Figure 15C:
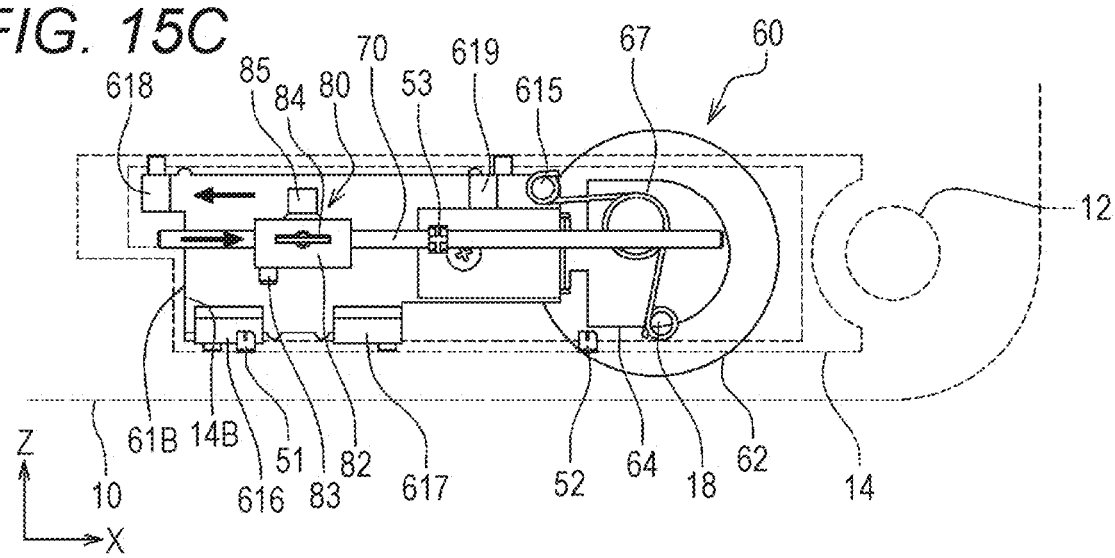
FIG. 15C is a partial back view of the blade driving device with the driving member moved in a closing direction after the state shown in FIG. 15B through driving of the motor.

As described above, as the driving member 80 is moved in the negative X-direction by the motor 30 rotating in the forward direction, the driving piece 85 on the driving member 80 eventually engages with the first engagement member 618 on the slider 61 to move the slider 61 in the negative X-direction as shown in FIG. 15A. As the motor 30 rotates, the driving member 80 and the slider 61 further move in the negative X-direction. When the first detectable piece 616 on the slider 61 aligns with the first sensor 51 as in FIG. 15B, the first sensor 51 detects the first detectable piece 616 on the slider 61. In response to a detection signal representing the detection of the first detectable piece 616 on the slider 61, the controller 3 applies, for example, a negative voltage to the motor 30 to rotate the motor 30 in the reverse direction (second direction) (step S13). This rotates the lead screw 40 in the reverse direction, and thus the driving member 80 moves in the positive X-direction (closing direction) as shown in FIG. 15C. In this state, the slider 61 in the movable member 60 is located in the negative X-direction away from the urging reference position and urged in the negative X-direction by the torsion spring 67. The movable member 60 thus moves in the negative X-direction until the end face 61B of the slider 61 (refer to FIG. 6) comes in contact with the side surface 14B of the frame 14 in the base 10 (refer to FIG. 5).

During the movement, the controller 3 monitors the third sensor 53 for detecting the third detectable piece 84 on the driving member 80 (step S14). In the present embodiment, the third sensor 53 detects the driving member 80 at a predetermined standby position. The third sensor 53 is located at the standby position set substantially in the middle of the guide shaft 70. Thus, when the third sensor 53 has not detected the third detectable piece 84 on the driving member 80, the controller 3 determines that the driving member 80 has not reached the standby position, and keeps the motor 30 rotating in the reverse direction.

As described above, as the driving member 80 is moved in the positive X-direction by the motor 30 rotating in the reverse direction, the driving member 80 moves to the standby position. The third sensor 53 then detects the third detectable piece 84 on the driving member 80. In response to a detection signal representing the detection of the third detectable piece 84 on the driving member 80, the controller 3 stops the motor 30 (step S15). In this manner, the opening operation shown in FIG. 13 is complete. The resultant state is the same as the state shown in FIG. 12C, which is referred to as an open state of the blade driving device 2.

Figure 16:
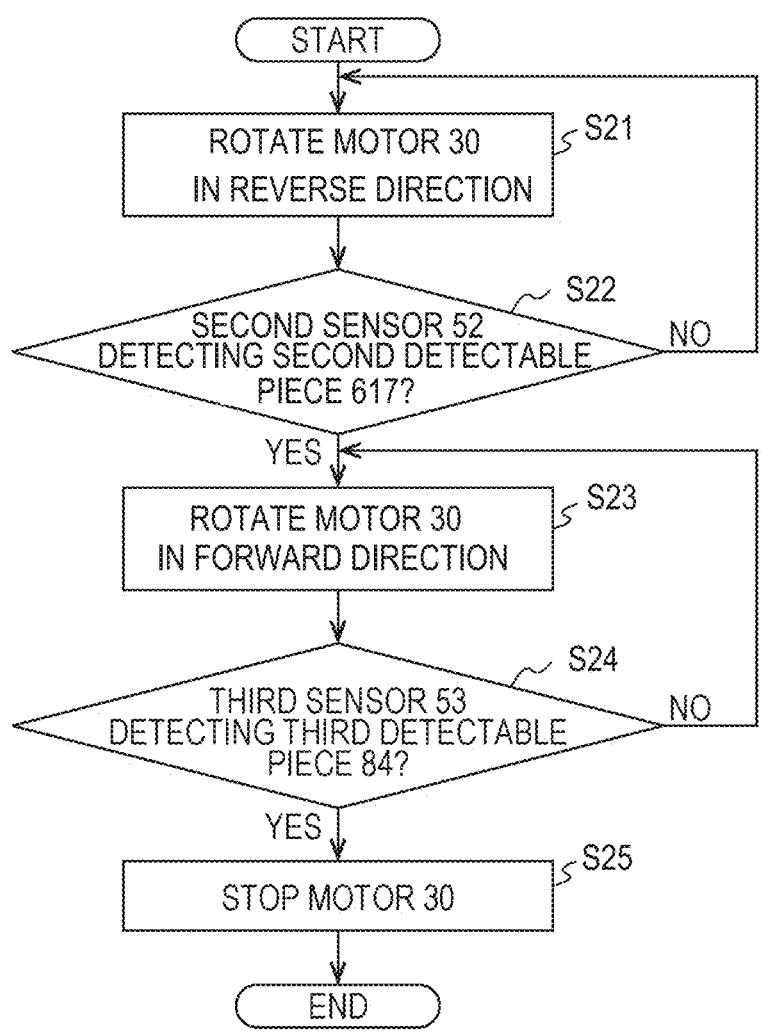
FIG. 16 is a flowchart showing control of the motor driven in the blade driving device shown in FIG. 2 for moving the movable member in the closing direction.

When the blade driving device 2 is in the open state as shown in FIG. 12C, the motor 30 may be driven to move the movable member 60 in the positive X-direction and cover the opening 12 in the base 10 with the blade 62. FIG. 16 is a flowchart showing the control of the motor 30 during the movement. The control will now be described in more detail.

The controller 3 first transmits a drive signal to the motor 30, and applies, for example, a negative voltage to the motor 30 to rotate the motor 30 in the reverse direction (second direction) (step S21). This also rotates the lead screw 40 in the reverse direction. The lead screw 40 in engagement with the protrusion 83 on the driving member 80 moves the driving member 80 in the positive X-direction (closing direction) along the guide shaft 70. The slider 61 in the movable member 60 urged in the negative X-direction by the torsion spring 67 remains stationary.

During the movement, the controller 3 monitors the second sensor 52 for detecting the second detectable piece 617 on the slider 61 (step S22). In the present embodiment, the second sensor 52 detects the movable member 60 moved by a predetermined distance from the urging reference position shown in FIG. 12B in the positive X-direction. In FIG. 12B, the second sensor 52 is located in the positive X-direction from the second detectable piece 617 on the slider 61. Thus, when the second sensor 52 has not detected the second detectable piece 617 on the slider 61, the controller 3 determines that the movable member 60 has not moved by a predetermined distance in the positive X-direction, and keeps the motor 30 rotating in the reverse direction.

Figure 17A:
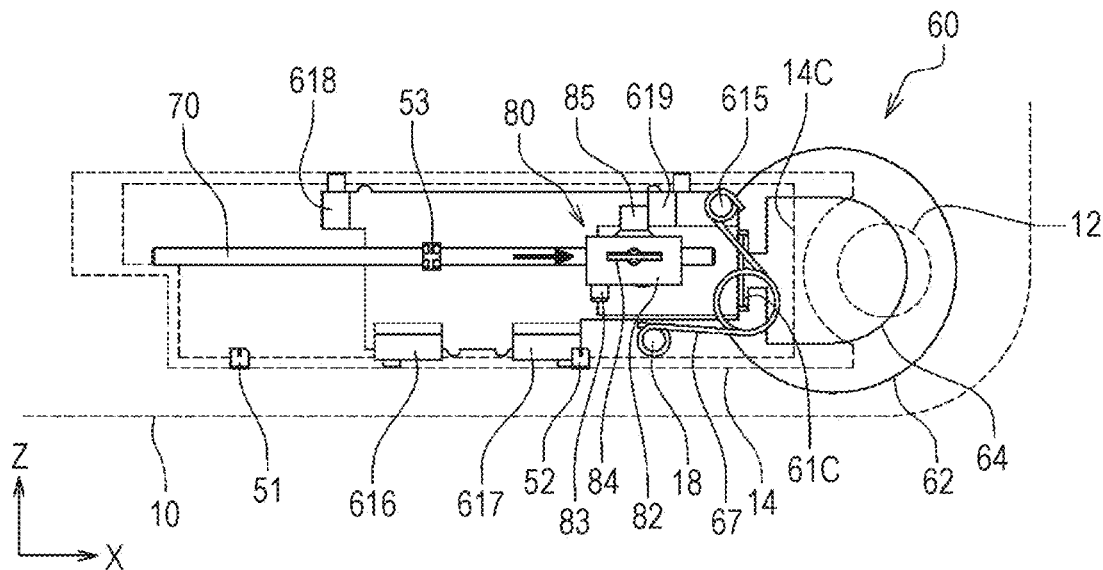
FIG. 17A is a partial back view of the blade driving device with the movable member moved in the closing direction from the open state shown in FIG. 12C through driving of the motor.
Figure 17B:
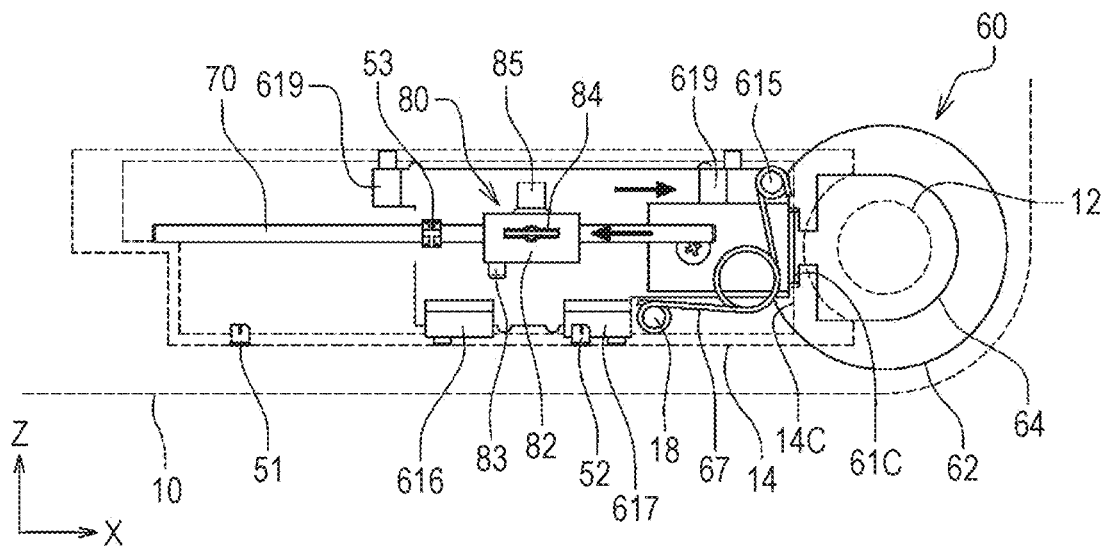
FIG. 17B is a partial back view of the blade driving device with the driving member moved in the opening direction after the state shown in FIG. 17A through driving of the motor.

As described above, as the driving member 80 is moved in the positive X-direction by the motor 30 rotating in the reverse direction, the driving piece 85 on the driving member 80 eventually engages with the second engagement member 619 on the slider 61 to move the slider 61 in the positive X-direction as shown in FIG. 17A. When the second detectable piece 617 on the slider 61 aligns with the second sensor 52 as shown in FIG. 17A, the second sensor 52 detects the second detectable piece 617 on the slider 61. In response to a detection signal representing the detection of the second detectable piece 617 on the slider 61, the controller 3 applies, for example, a positive voltage to the motor 30 to rotate the motor 30 in the forward direction (first direction) (step S23). This rotates the lead screw 40 in the forward direction, and thus the driving member 80 moves in the negative X-direction (opening direction) as shown in FIG. 17B. In this state, the slider 61 in the movable member 60 is located in the positive X-direction away from the urging reference position and urged in the positive X-direction by the torsion spring 67. The movable member 60 thus moves in the positive X-direction until the end face 61C of the slider 61 (refer to FIG. 6) comes in contact with the side surface 14C of the frame 14 in the base 10 (refer to FIG. 4).

During the movement, the controller 3 monitors the third sensor 53 for detecting the third detectable piece 84 on the driving member 80 (step S24). When the third sensor 53 has not detected the third detectable piece 84 on the driving member 80, the controller 3 determines that the driving member 80 has not reached the standby position, and keeps the motor 30 rotating in the reverse direction. When the third sensor 53 detects the third detectable piece 84 on the driving member 80, the controller 3 stops the motor 30 (step S25) in response to a detection signal representing the detection of the third detectable piece 84 on the driving member 80. In this manner, the closing operation shown in FIG. 13 is complete. The resultant state is the closed state shown in FIG. 12A.

As described above, in the present embodiment, the lead screw 40 mounted on the motor shaft of the motor 30 and the driving member 80 together transmit the rotation of the motor 30 to the slider 61 in the movable member 60, and form a power transmission mechanism that moves the movable member 60. The lead screw 40 and the protrusion 83 on the driving member 80 together transmit the rotation of the motor 30 to the driving member 80, and form a gear mechanism that moves the driving member 80. The power transmission mechanism and the gear mechanism are not limited to the illustrated examples, and may include other power transmission elements combined together.

The blade driving device 2 in the present embodiment moves the movable member 60 in the positive X-direction (closing direction) through driving of the motor 30 and covers the opening 12 in the base 10 with the blade 62 in the movable member 60, and moves the blade 62 in the movable member 60 in the negative X-direction (opening direction) through driving of the motor 30 to uncover the opening 12 in the base 10. As described above, the movable member 60 in the blade driving device 2 according to the present embodiment also includes the knob 63 as the operable member, which allows the user to directly move the blade 62 in the positive X-direction (closing direction) or the negative X-direction (opening direction) from outside the electronic device 1. In the blade driving device 2 according to the present embodiment, the blade 62 for covering the opening 12 for the imaging device 4 can be operated both through driving of the motor 30 and a manual operation of the user.

As described above, the movable member 60 is urged in X-direction by the torsion spring 67, and thus the end face 61B or 61C of the slider 61 in the movable member 60 can come in contact with the side surface 14B or 14C of the frame 14 in the base 10 without driving of the motor 30. Thus, a lead screw 40 shorter in X-direction can be used, and thus the blade driving device 2 can be smaller.

In the above embodiment, as shown in FIG. 1, the base 10 in the blade driving device 2 is a portion of the housing (exterior) that is viewable from outside the electronic device 1. The blade 62 in the blade driving device 2 is exposed outside the electronic device 1. In other embodiments, the base 10 may be accommodated and hidden in the housing of the electronic device 1.

If, for example, the motor 30 in the blade driving device 2 malfunctions or is driven by a third party operation to uncover the opening 12, the user can directly operate the blade 62 from outside the electronic device 1 and cover the opening 12 with the blade 62. This prevents unintended image capturing with the imaging device 4. In particular, the electronic device 1 connected to a network, such as the Internet, through a communication interface may be operated remotely by a malicious program without being noticed by the user. As described above, the opening 12 for the imaging device 4 can be covered with the blade 62 by the user directly operating the blade 62 from outside the electronic device 1 for privacy protection of the user.

The sign (negative and positive) of the voltage applied to the motor 30 and the rotation direction (forward direction and reverse direction) of the motor 30 described above are mere examples in which the signs and the directions are each opposite to each other, and are interchangeable depending on each embodiment of the present invention.

Second Embodiment

An electronic device according to a second embodiment of the present invention will now be described in detail with reference to FIGS. 18 to 31. In FIGS. 18 to 31, the same or corresponding components are given the same reference numerals, and will not be described repeatedly. In FIGS. 18 to 31, the scale and dimensions of each component may be exaggerated, or one or more components may not be shown.

Figure 18:
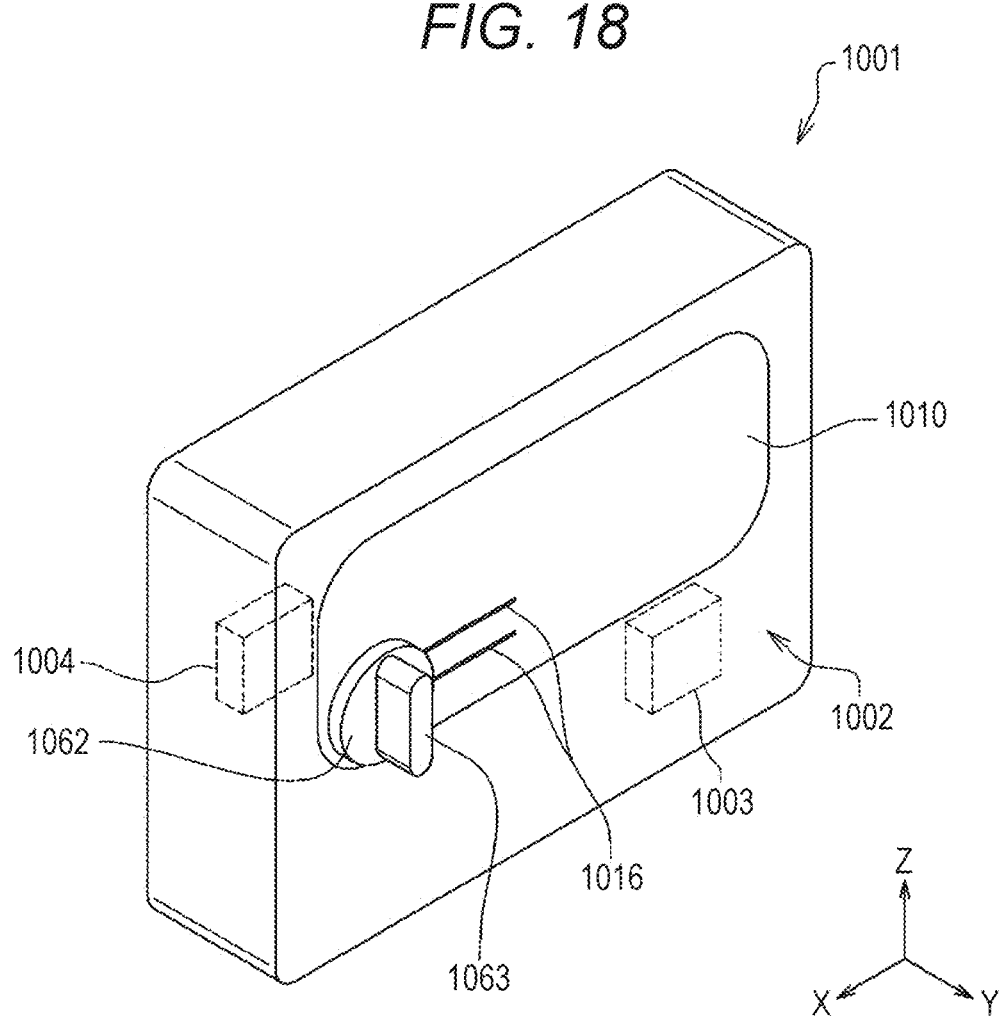
FIG. 18 is a perspective view of an electronic device according to another embodiment of the present invention.

FIG. 18 is a perspective view of an electronic device 1001 according to one embodiment of the present invention. The electronic device 1001 is a network device including an internal communication interface (not shown), through which the electronic device 1001 is connectable to a network, such as the Internet. The electronic device 1001 also incorporates an imaging device 1004. Examples of the electronic device 1001 include a smartphone, a tablet, a computer, a security camera, a drone, and a smart speaker.

As shown in FIG. 18, the electronic device 1001 includes the imaging device 1004, a blade driving device 1002 for blocking light entering an image sensor (not shown) in the imaging device 1004, and a controller 1003 for controlling the operation of the blade driving device 1002. In the present embodiment, for ease of explanation, the positive Z-direction in FIG. 18 is referred to as up or upward, the negative Z-direction is referred to as down or downward, the positive Y-direction is referred to as front or frontward, and the negative Y-direction is referred to as back or backward.

Figure 19:
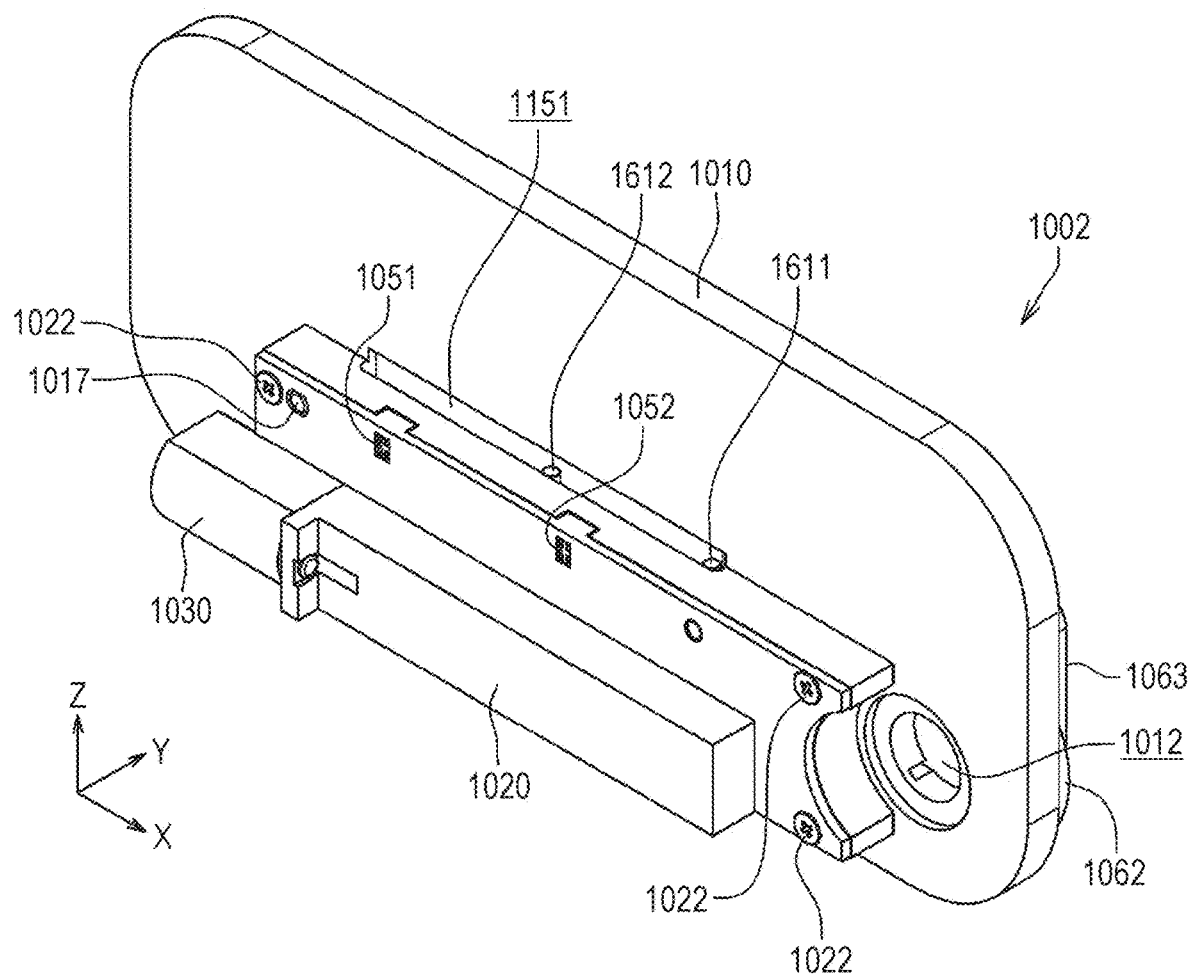
FIG. 19 is a back perspective view of a blade driving device included in the electronic device in FIG. 18.
Figure 20:
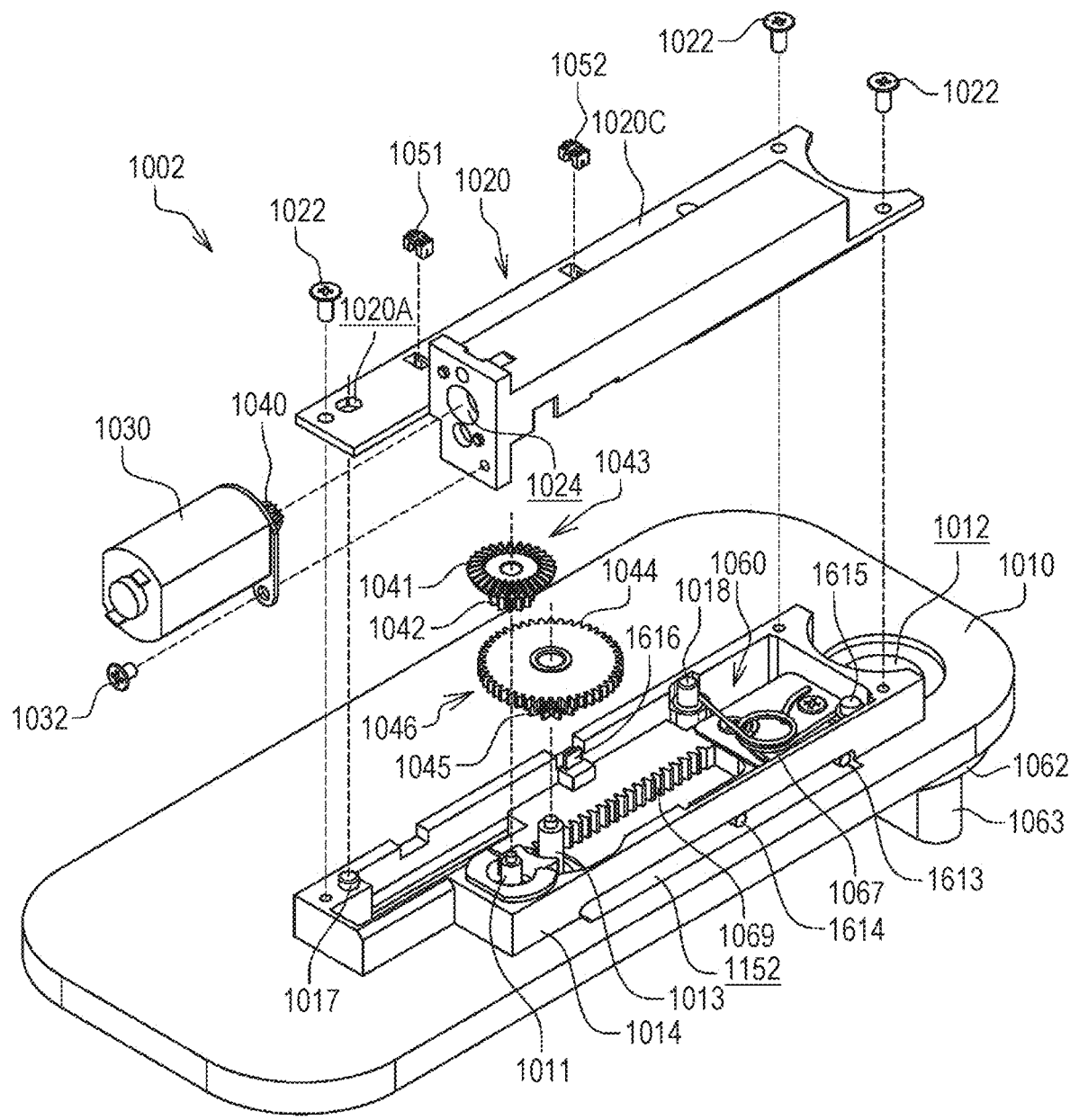
FIG. 20 is an exploded perspective view of the blade driving device in FIG. 19.

FIG. 19 is a back perspective view of the blade driving device 1002. FIG. 20 is an exploded perspective view of the blade driving device 1002 in FIG. 19. As shown in FIGS. 19 and 20, the blade driving device 1002 includes a substantially rectangular plate-like base 1010, a casing 1020 attached to the back face of the base 1010, and a motor 1030 attached to the casing 1020. The base 1010 in the present embodiment has a circular opening 1012. The center axis of the opening 1012 is substantially aligned with the optical axis of the imaging device 1004. Light external to the electronic device 1001 enters the image sensor in the imaging device 1004 incorporated in the electronic device 1001 through the opening 1012.

Figure 21:
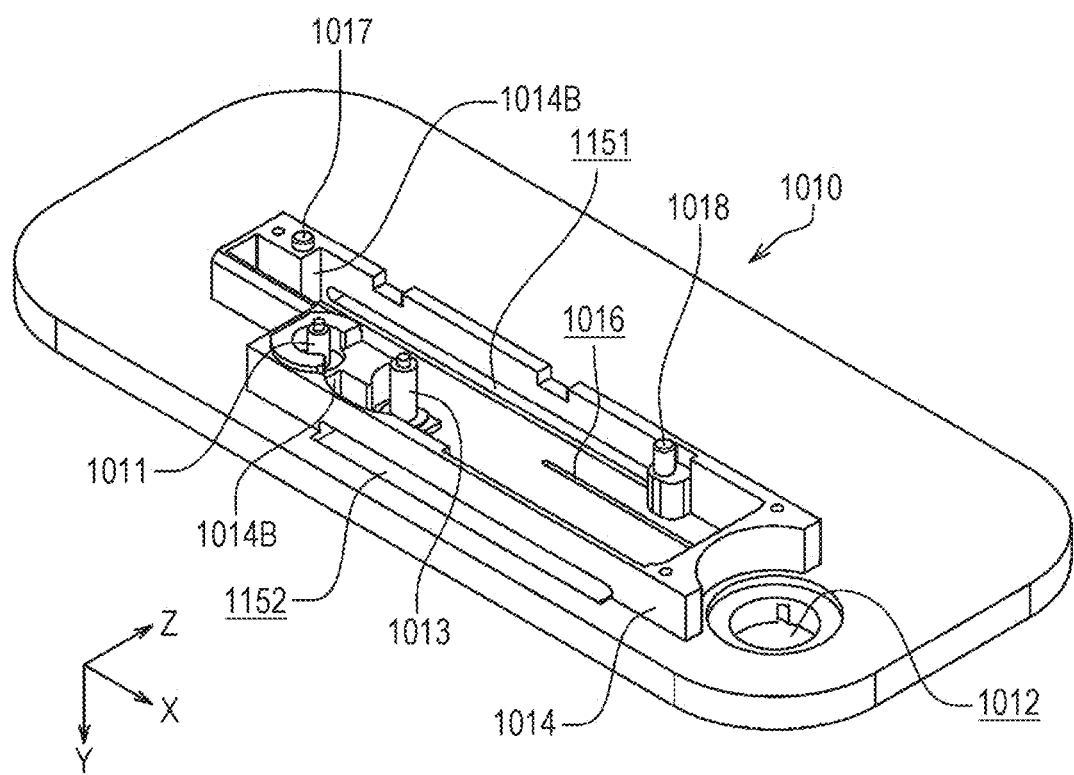
FIG. 21 is a perspective view of a base included in the blade driving device in FIG. 19.
Figure 22:
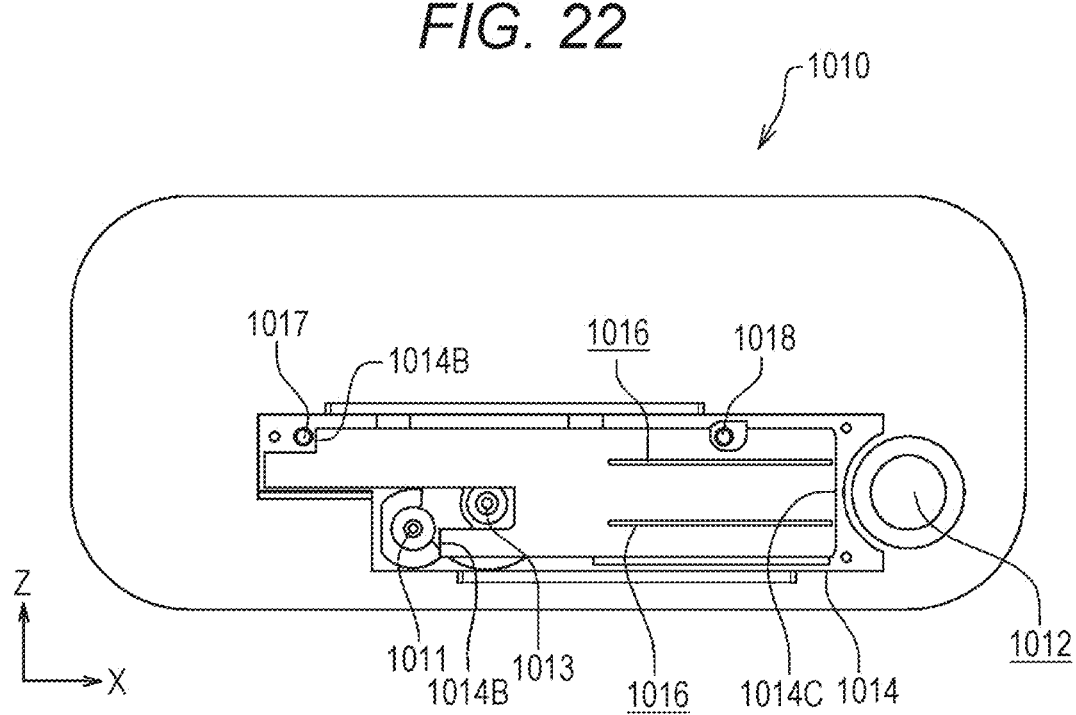
FIG. 22 is a back view of the base in FIG. 21.

FIG. 21 is a perspective view of the base 1010. FIG. 22 is a back view of the base 1010. As shown in FIGS. 21 and 22, the back face of the base 1010 has a frame 1014 protruding in the negative Y-direction. The frame 1014 has protrusions 1017 and 1018 protruding in the negative Y-direction, and motor shafts 1011 and 1013 extending in the negative Y-direction. As shown in FIG. 20, the frame 1014 receives the casing 1020 attached with screws 1022. The protrusion 1017 on the frame 1014 engages with a positioning hole 1020A in the casing 1020 to position the frame 1014 and the casing 1020 on the XZ plane.

As shown in FIG. 20, a first sensor 1051 and a second sensor 1052 are embedded in a side wall 1020C of the casing 1020 in the negative Y-direction. The sensors 1051 and 1052 are connected to the controller 1003 (refer to FIG. 18) with signal lines (not shown). The sensors 1051 and 1052 output signals, which are input to the controller 1003. The sensors 1051 and 1052 may be any sensors that detect a detection target. Examples of the sensors 1051 and 1052 include optical sensors and proximity sensors (operating with, for example, an eddy current, capacitance, or a magnetic force).

The motor 1030 is attached to the casing 1020 with a screw 1032. The motor 1030 is connected to the controller 1003 (refer to FIG. 18) with a signal line (not shown) and driven in response to a signal from the controller 1003. As shown in FIG. 20, the motor 1030 includes a motor shaft extending in X-direction, to which a bevel gear 1040 is connected. The bevel gear 1040 is received in the casing 1020 through an opening 1024 in the casing 1020.

The casing 1020 accommodates a double gear 1043 including a bevel gear 1041 and a spur gear 1042, and a double gear 1046 including a spur gear 1044 and a pinion gear 1045. The double gear 1043 is mounted on the motor shaft 1011 in the base 1010 in a rotatable manner. The double gear 1046 is mounted on a motor shaft 1013 in the base 1010 in a rotatable manner. The bevel gear 1041 in the double gear 1043 meshes with the bevel gear 1040 in the motor 1030. The spur gear 1042 in the double gear 1043 meshes with the spur gear 1044 in the double gear 1046. As the motor shaft of the motor 1030 rotates, the double gear 1046 rotates with the rotation of the bevel gear 1041 and the double gear 1043.

Figure 23:
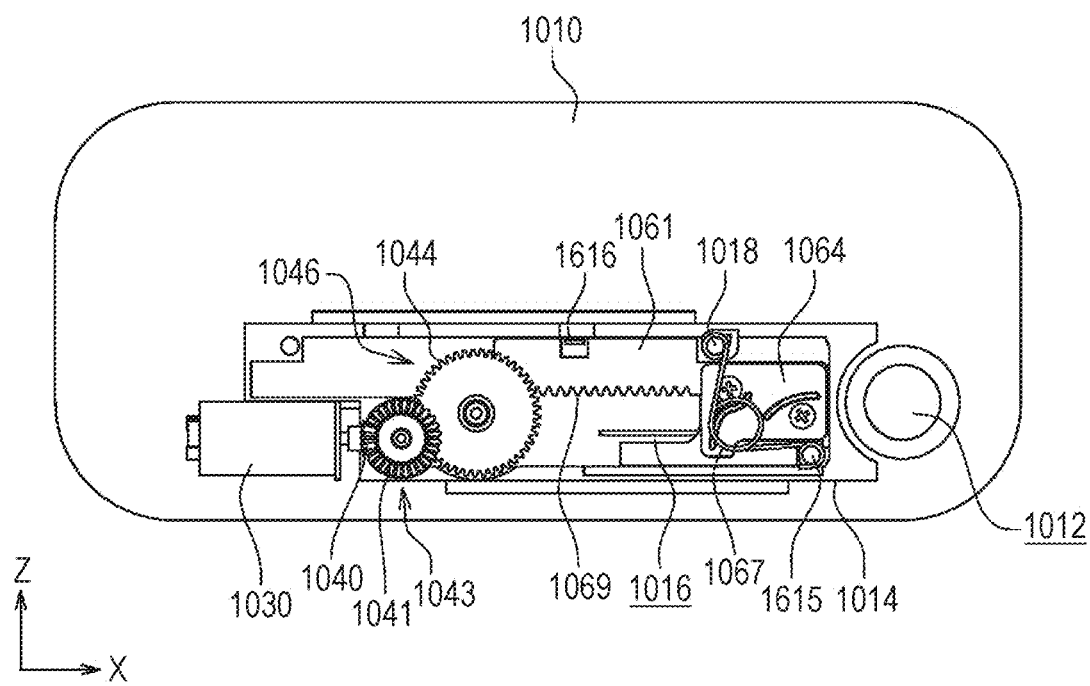
FIG. 23 is a back view of the blade driving device in FIG. 19 with a casing removed.
Figure 24:
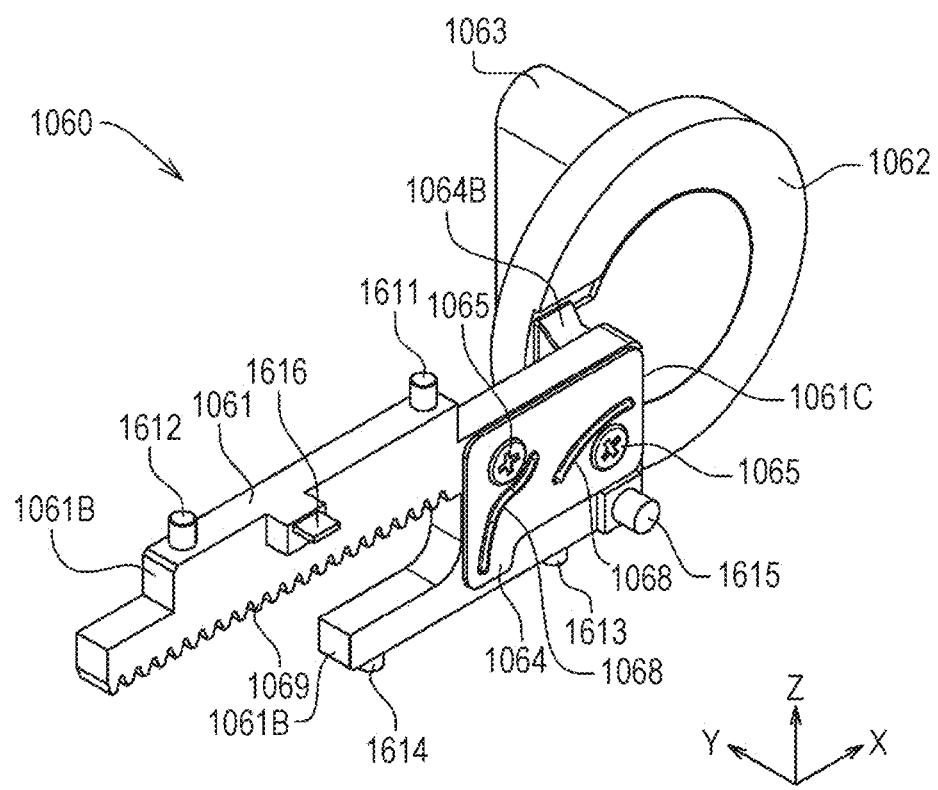
FIG. 24 is a perspective view of a movable member included in the blade driving device in FIG. 19.
Figure 25:
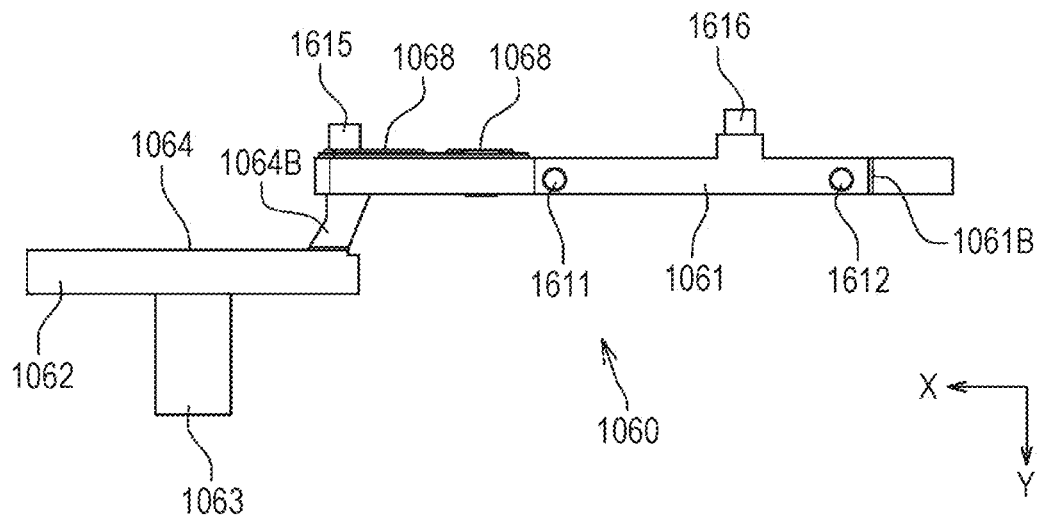
FIG. 25 is a plan view of the movable member in FIG. 24.
Figure 26:
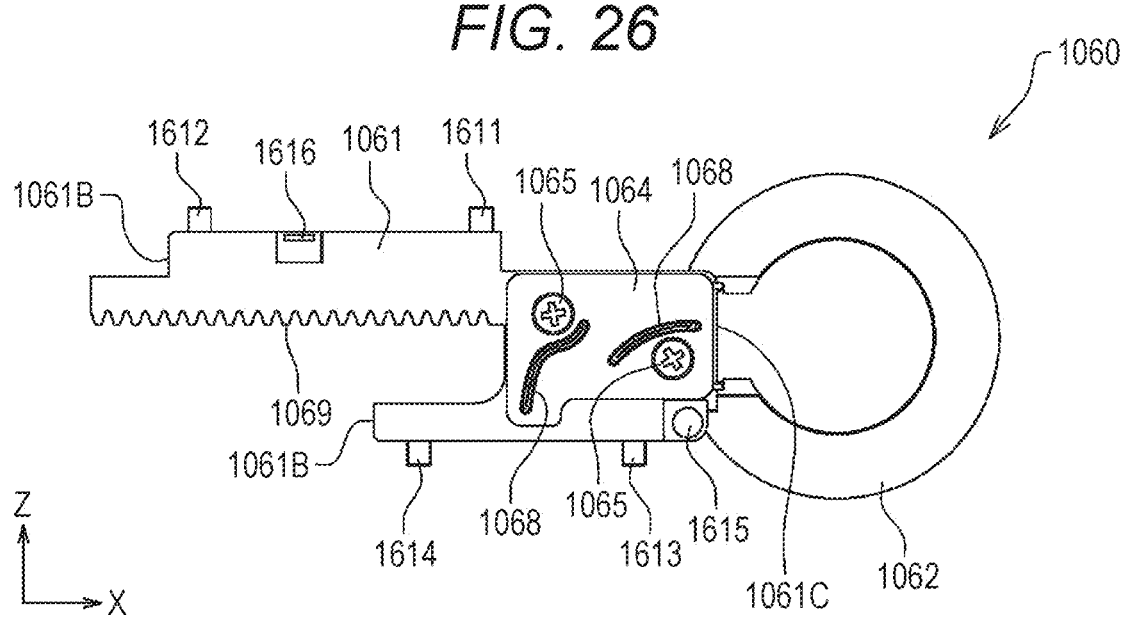
FIG. 26 is a back view of the movable member in FIG. 24.
Figure 27:
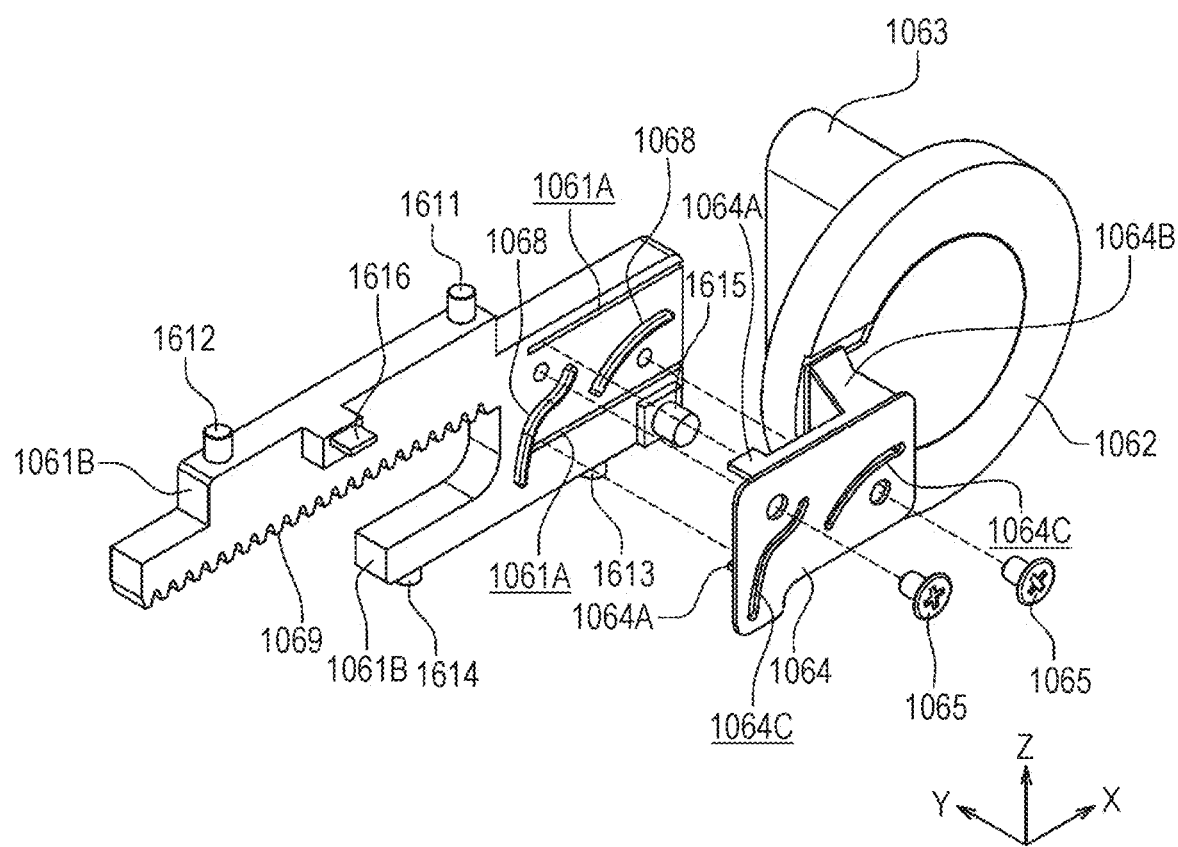
FIG. 27 is an exploded perspective view of the movable member in FIG. 24.

FIG. 23 is a back view of a movable member 1060 with the casing 1020 removed from the blade driving device 1002 shown in FIG. 19. As shown in FIG. 23, the casing 1020 accommodates the movable member 1060 that is movable in X-direction relative to the base 1010. FIG. 24 is a perspective view of the movable member 1060. FIG. 25 is a plan view of the movable member 1060. FIG. 26 is a back view of the movable member 1060. FIG. 27 is an exploded perspective view of the movable member 1060. As shown in FIGS. 24 to 27, the movable member 1060 includes a substantially plate-like slider 1061, a substantially disk-shaped blade 1062, a knob 1063 extending in the positive Y-direction from the blade 1062, and a connector 1064 connecting the blade 1062 and the slider 1061. The connector 1064 is fixed to the blade 1062 with, for example, an adhesive, and also to the slider 1061 with screws 1065. As shown in FIG. 27, the slider 1061 has two grooves 1061A for receiving legs 1064A of the connector 1064. When the connector 1064 is attached to the slider 1061, the legs 1064A of the connector 1064 are fitted in the grooves 1061A on the slider 1061. The slider 1061 also has raised portions 1068 for preventing a torsion spring 1067 (described later) from coming in contact with the screws 1065. The connector 1064 has insertion slots 1064C receiving the raised portions 1068.

As shown in FIGS. 24 to 27, the slider 1061 includes cylindrical guides 1611 and 1612 protruding in the positive Z-direction, cylindrical guides 1613 and 1614 protruding in the negative Z-direction, and a protrusion 1615 extending in the negative Y-direction. The slider 1061 also includes a detectable piece 1616 detectable by the first sensor 1051 and the second sensor 1052 near its edge in the positive Z-direction. In the present embodiment, the detectable piece 1616 on the slider 1061 can move through a groove in each of the first sensor 1051 and the second sensor 1052. The first sensor 1051 and the second sensor 1052 detect the position of the slider 1061 by detecting the detectable piece 1616 on the slider 1061 within the groove.

As shown in FIGS. 24, 26, and 27, the slider 1061 includes a rack gear 1069 having multiple teeth arranged in X-direction. The rack gear 1069 meshes with the pinion gear 1045 in the double gear 1046. The rack gear 1069 meshing with the pinion gear 1045 in the double gear 1046 enables the slider 1061 to move in X-direction with the rotation of the double gear 1046.

Referring back to FIG. 21, the base 1010 has guide grooves 1151 and 1152 extending in X-direction on side surfaces of the frame 1014. The guide groove 1151 on the base 1010 receives the guides 1611 and 1612 on the slider 1061. The guide groove 1152 receives the guides 1613 and 1614 on the slider 1061. The guides 1611 and 1612 on the slider 1061 are movable in X-direction within the guide groove 1151 on the base 1010. The guides 1613 and 1614 on the slider 1061 are movable in X-direction within the guide groove 1152 on the base 1010. The slider 1061 is thus movable in X-direction within the frame 1014 in the base 1010.

As shown in FIGS. 21 and 22, the base 1010 has two slots 1016 extending in X-direction inside the frame 1014. The slots 1016 extend through the base 1010. The slots 1016 receive intermediate members 1064B (refer to FIGS. 25 and 27) of the connector 1064 included in the movable member 1060. In the above structure, the blade 1062 connected to the connector 1064 and the knob 1063 on the blade 1062 are located on the side of the base 1010 opposite to the slider 1061 (in front of the base 1010). The movable member 1060 is thus movable in X-direction with the blade 1062 and the knob 1063 located in front of the base 1010. In the present embodiment, as shown in FIG. 18, the front face of base 1010 forms a portion of the front face of the electronic device 1001.

As shown in FIG. 20, the torsion spring 1067 is accommodated in the casing 1020. The torsion spring 1067 has one end engaging with the protrusion 1615 on the slider 1061 and the other end engaging with the protrusion 1018 on the frame 1014 in the base 1010. The torsion spring 1067 urges the slider 1061 (the movable member 1060) in X-direction (the positive X-direction or the negative X-direction) relative to the base 1010. As described later, the direction in which the torsion spring 1067 urges the movable member 1060 is changed in accordance with the position of the slider 1061. In FIG. 23, the torsion spring 1067 urges the movable member 1060 in the positive X-direction.

Figure 28A:
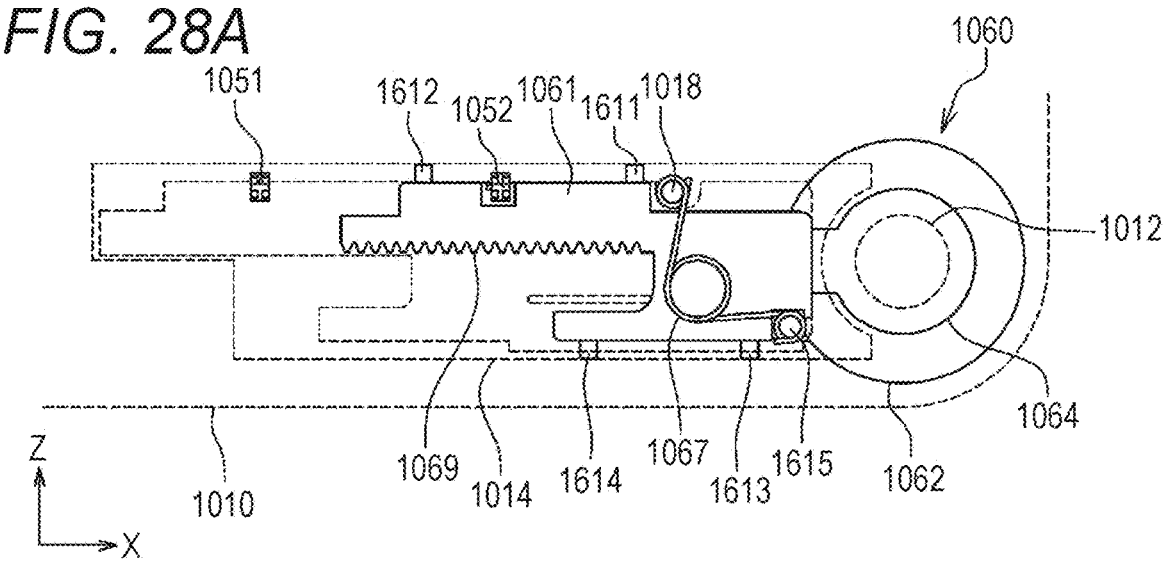
FIG. 28A is a partial back view of the blade driving device in the state shown in FIG. 19.

FIG. 28A is a partial back view of the blade driving device 1002 in the state shown in FIG. 19. In FIG. 28A, the blade 1062 included in the movable member 1060 overlaps and covers the opening 1012 in the base 1010. This state is referred to as a closed state of the blade driving device 1002. In the closed state, the opening 1012 in the base 1010 is located between the blade 1062 in the movable member 1060 and the image sensor included in the imaging device 1004. The blade 1062 in the movable member 1060 is exposed outside the electronic device 1001. The user can thus operate the exposed blade 1062 as appropriate.

The blade 1062 in the movable member 1060 can block light external to the electronic device 1001 from entering the image sensor in the imaging device 1004 incorporated in the electronic device 1001 in a given manner. For example, the blade 1062 may include a shield plate that completely blocks external light, a ground glass plate that scatters light, or a filter that selectively transmits light of a predetermined wavelength. In the present embodiment, the blade 1062 includes a shield plate that completely blocks external light. Thus, light external to the electronic device 1001 is blocked at the blade 1062 and does not enter the image sensor in the imaging device 1004 incorporated in the electronic device 1001. For example, when the imaging device 1004 incorporated in the electronic device 1001 is not in use, the blade driving device 1002 in the closed state prevents external light from entering the image sensor in the imaging device 1004 incorporated in the electronic device 1001.

The blade 1062 in the movable member 1060 can be manually moved in the negative X-direction when the blade driving device 1002 is in the closed state. More specifically, the user can move the blade 1062 (movable member 1060) in the negative X-direction by holding and moving the knob 1063 (refer to FIG. 18) for the movable member 1060 located on the front face of the electronic device 1001 in the negative X-direction.

Figure 28B:
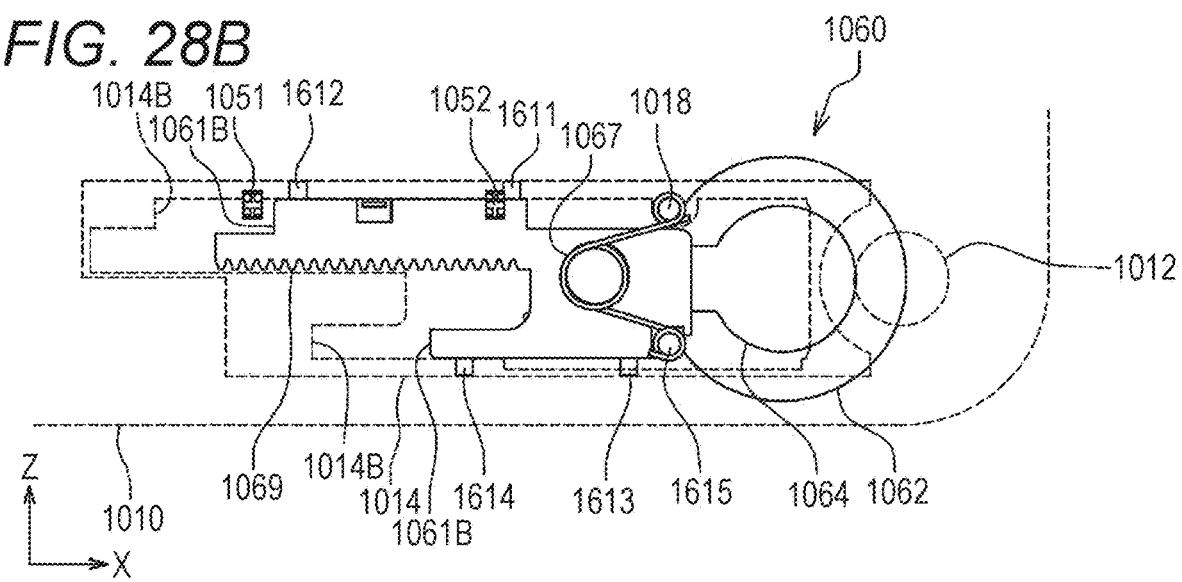
FIG. 28B is a partial back view of the blade driving device with the movable member moved in an opening direction from the closed state shown in FIG. 28A.

In the closed state of the blade driving device 1002 as in FIG. 28A, the torsion spring 1067 urges the movable member 1060 in the positive X-direction. Once the movable member 1060 is moved until the protrusion 1615 on the slider 1061 is located in the negative X-direction from the protrusion 1018 on the frame 1014 included in the base 1010, the torsion spring 1067 changes the direction of urging the movable member 1060 in the negative X-direction. In FIG. 28B, the movable member 1060 is moved in the negative X-direction from the position shown in FIG. 28A. The protrusion 1615 on the slider 1061 included in the movable member 1060 is aligned with the protrusion 1018 on the frame 1014 included in the base 1010 in X-direction (the position of the movable member 1060 in this state is referred to as an urging reference position). The direction in which the movable member 1060 is urged by the torsion spring 1067 is reversed in accordance with the position of the movable member 1060 either in the positive X-direction or in the negative X-direction away from the urging reference position. More specifically, when the movable member 1060 is located in the positive X-direction away from the urging reference position, the torsion spring 1067 urges the movable member 1060 in the positive X-direction. When the movable member 1060 is located in the negative X-direction away from the urging reference position, the torsion spring 1067 urges the movable member 1060 in the negative X-direction.

As described above, the torsion spring 1067 in the present embodiment urges the movable member 1060 in the negative X-direction when the movable member 1060 is located in the negative X-direction away from the urging reference position, and in the positive X-direction when the movable member 1060 is located in the positive X-direction away from the urging reference position. Such an urging member allows an easy operation for the user as described below and facilitates smooth movement of the movable member in the opening or closing direction. The urging member is not limited to the illustrated torsion spring 1067.

The torsion spring 1067 as the urging member urges the movable member 1060 in the negative X-direction once the user moves the movable member 1060 in the negative X-direction away from the urging reference position with the knob 1063 for the movable member 1060, reducing a force to be applied onto the knob 1063 by the user. The movable member 1060 is moved in the negative X-direction until the end face 1061B of the slider 1061 (refer to FIG. 24) eventually comes in contact with the side surface 1014B of the frame 1014 in the base 1010 (refer to FIG. 22) as in FIG. 28C. In this state, the blade 1062 in the movable member 1060 is apart from the opening 1012 in the base 1010, uncovering the opening 1012 in the base 1010.

Figure 28C:
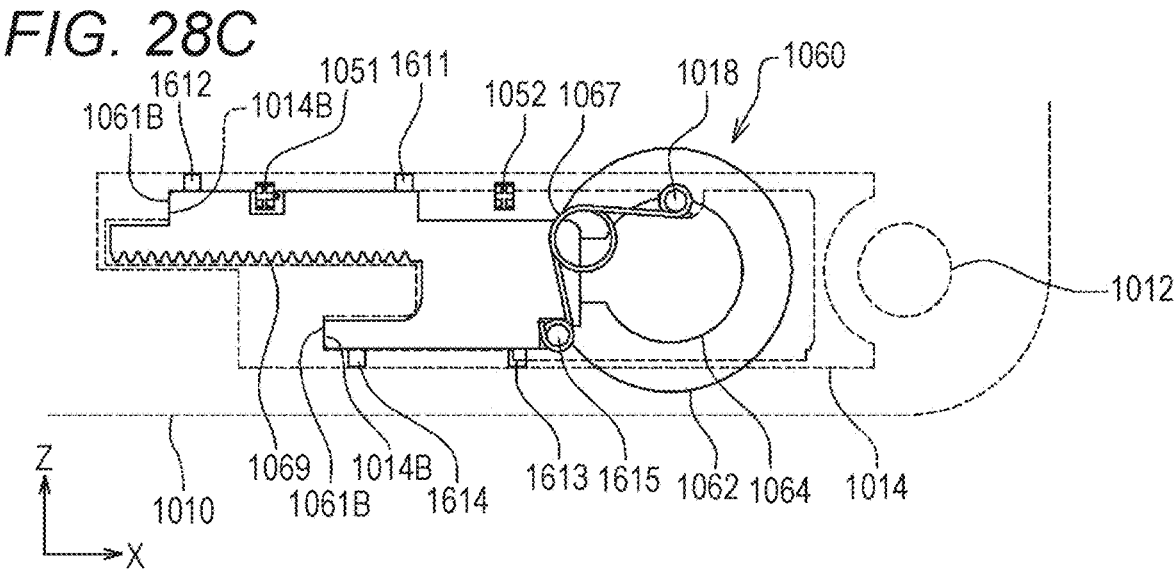
FIG. 28C is a partial back view of the blade driving device with the movable member moved in the opening direction from the state shown in FIG. 28B under an urging force of a torsion spring.

In the state in FIG. 28C, the user can move the blade 1062 (movable member 1060) in the positive X-direction by holding and moving the knob 1063 for the movable member 1060 in the positive X-direction. Once the movable member 1060 is moved in the positive X-direction away from the urging reference position, the torsion spring 1067 urges the movable member 1060 in the positive X-direction, reducing a force to be applied onto the knob 1063 by the user. The movable member 1060 is moved in the positive X-direction until the end face 1061C of the slider 1061 (refer to FIG. 24) eventually comes in contact with the side surface 1014C of the frame 1014 in the base 1010 (refer to FIG. 22) as in FIG. 28A. In this state, the blade 1062 in the movable member 1060 is aligned with the opening 1012 in the base 1010, covering the opening 1012 in the base 1010.

As described above, the knob 1063 for the movable member 1060 in the present embodiment functions as an operable member that is located on the side of the base 1010 opposite to the slider 1061 and is operable to move the blade 1062. The blade driving device 1002 in the present embodiment with such an operable member allows the user to directly move the blade from outside the electronic device 1001 with the operable member. The operable member is not limited to the illustrated knob 1063, and may be, for example, a recess on the surface of the blade 1062.

Figure 29:
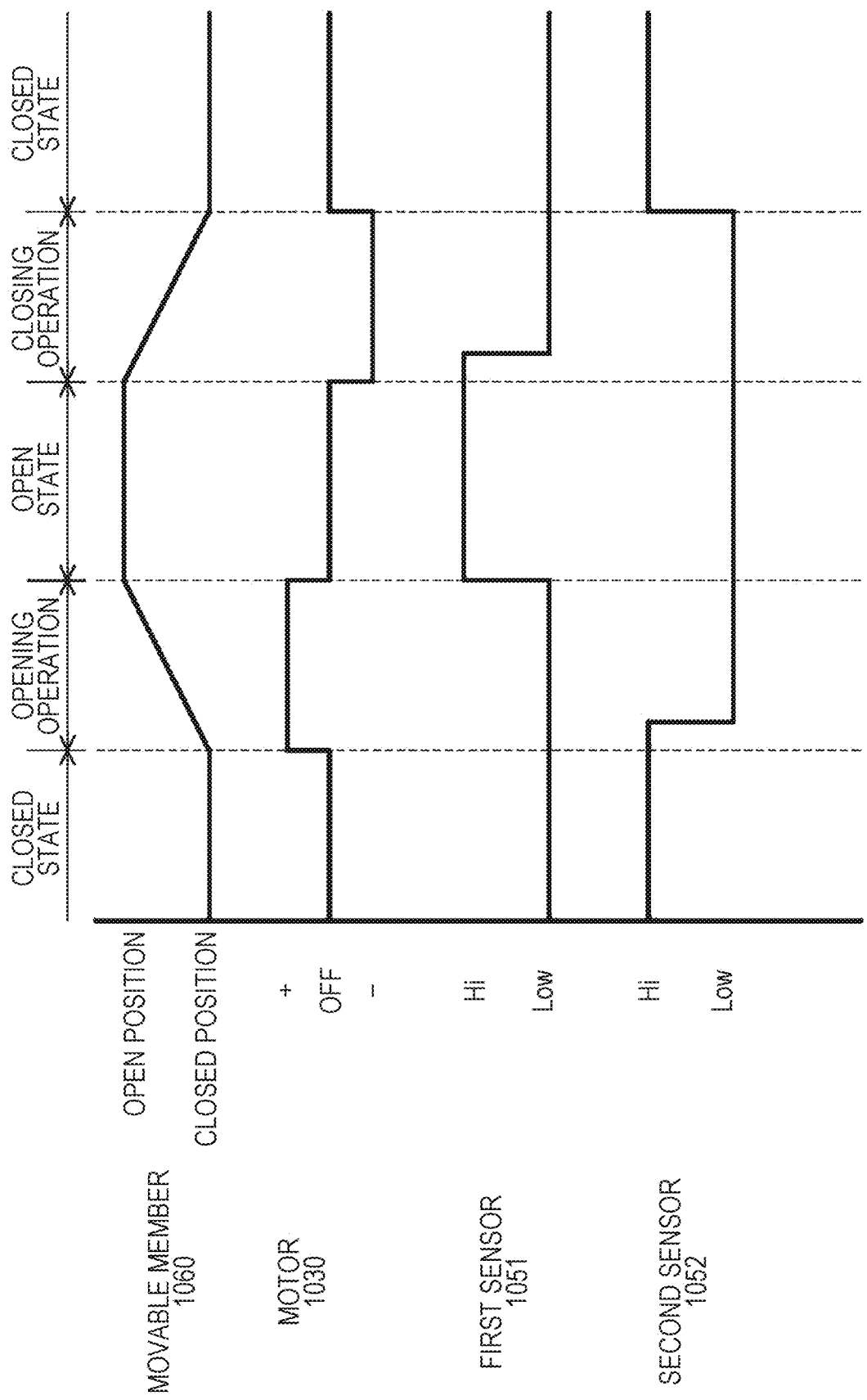
FIG. 29 is a timing chart of a control sequence of a motor driven in the blade driving device shown in FIG. 19 to move the movable member.

The blade 1062 in the movable member 1060 may also be moved in X-direction through driving of the motor 1030. FIG. 29 is a timing chart of a control sequence of the motor 1030 driven to move the blade 1062 in the movable member 1060 in X-direction.

Figure 30:
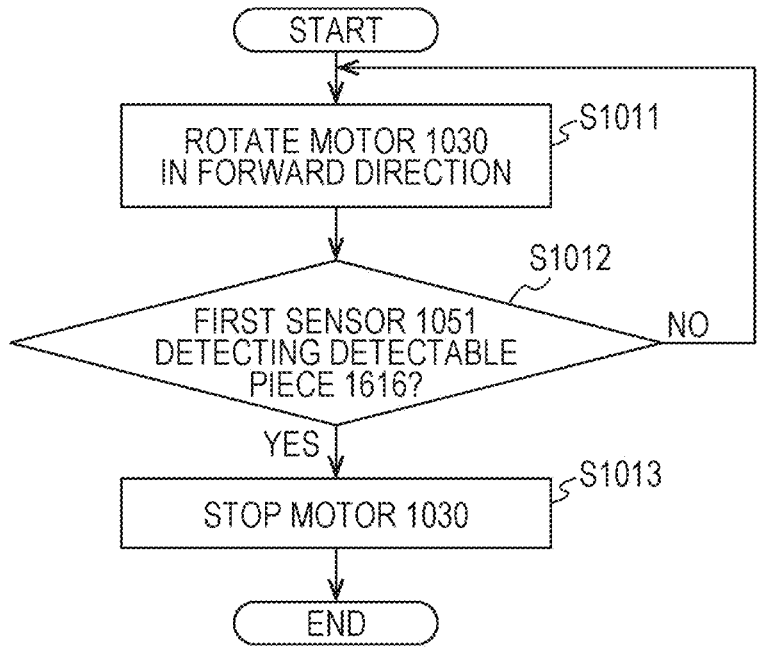
FIG. 30 is a flowchart showing control of the motor driven in the blade driving device shown in FIG. 19 for moving the movable member in the opening direction.

For example, when the blade driving device 1002 is in the closed state as in FIG. 28A, the motor 1030 may be driven to move the movable member 1060 in the negative X-direction and uncover the opening 1012 in the base 1010. FIG. 30 is a flowchart showing the control of the motor 1030 during the movement. The control will now be described in more detail.

The controller 1003 first transmits a drive signal to the motor 1030, and applies, for example, a positive voltage to the motor 1030 to rotate the motor 1030 in the forward direction (first direction) (step S1011). The rotation of the motor 1030 is transmitted to the slider 1061 through the bevel gear 1040, the double gear 1043, the double gear 1046, and the rack gear 1069, and moves the slider 1061 (movable member 1060) in the negative X-direction (opening direction). During the movement, the controller 1003 monitors the first sensor 1051 for detecting the detectable piece 1616 on the slider 1061 (step S1012). In the present embodiment, the first sensor 1051 detects the movable member 1060 moved by a predetermined distance from the urging reference position shown in FIG. 28B in the negative X-direction. In FIG. 28B, the first sensor 1051 is located in the negative X-direction from the detectable piece 1616 on the slider 1061. Thus, when the first sensor 1051 has not detected the detectable piece 1616 on the slider 1061, the controller 1003 determines that the movable member 1060 has not moved by a predetermined distance in the negative X-direction, and keeps the motor 1030 rotating in the forward direction.

As the motor 1030 is rotated in the forward direction as described above, the slider 1061 moves in the negative X-direction. When the detectable piece 1616 on the slider 1061 aligns with the first sensor 1051, the first sensor 1051 detects the detectable piece 1616 on the slider 1061. In response to a detection signal representing the detection of the detectable piece 1616 on the slider 1061, the controller 1003 stops applying the voltage to the motor 1030 to stop the motor 1030 (step S1013). In this state, the slider 1061 in the movable member 1060 is located in the negative X-direction away from the urging reference position and thus urged in the negative X-direction by the torsion spring 1067. The end face 1061B of the slider 1061 (refer to FIG. 24) is in contact with the side surface 1014B of the frame 1014 in the base 1010 (refer to FIG. 22). In this manner, the opening operation shown in FIG. 29 is complete. The resultant state is the same as the state shown in FIG. 28C, which is referred to as an open state of the blade driving device 1002.

Figure 31:
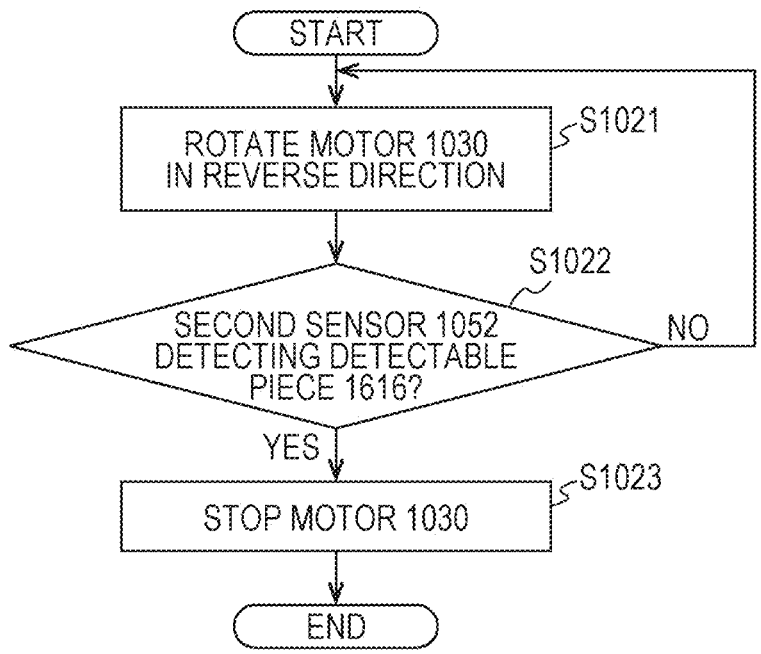
FIG. 31 is a flowchart showing control of the motor driven in the blade driving device shown in FIG. 19 for moving the movable member in the closing direction.

When the blade driving device 1002 is in the open state as in FIG. 28C, the motor 1030 may be driven to move the movable member 1060 in the positive X-direction and cover the opening 1012 in the base 1010 with the blade 1062. FIG. 31 is a flowchart showing the control of the motor 1030 during the movement. The control will now be described in more detail.

The controller 1003 first transmits a drive signal to the motor 1030, and applies, for example, a negative voltage to the motor 1030 to rotate the motor 1030 in the reverse direction (second direction) (step S1021). The rotation of the motor 1030 is transmitted to the slider 1061 through the bevel gear 1040, the double gear 1043, the double gear 1046, and the rack gear 1069, and moves the slider 1061 (movable member 1060) in the positive X-direction (closing direction). During the movement, the controller 1003 monitors the second sensor 1052 for detecting the detectable piece 1616 on the slider 1061 (step S1022). In the present embodiment, the second sensor 1052 detects the movable member 1060 moved by a predetermined distance from the urging reference position shown in FIG. 28B in the positive X-direction. In FIG. 28B, the second sensor 1052 is located in the positive X-direction from the detectable piece 1616 on the slider 1061. Thus, when the second sensor 1052 has not detected the detectable piece 1616 on the slider 1061, the controller 1003 determines that the movable member 1060 has not moved by a predetermined distance in the positive X-direction, and keeps the motor 1030 rotating in the reverse direction.

As the motor 1030 is rotated in the reverse direction as described above, the slider 1061 moves in the positive X-direction. When the detectable piece 1616 on the slider 1061 aligns with the second sensor 1052, the second sensor 1052 detects the detectable piece 1616 on the slider 1061. In response to a detection signal representing the detection of the detectable piece 1616 on the slider 1061, the controller 1003 stops applying the voltage to the motor 1030 to stop the motor 1030 (step S1023). In this state, the slider 1061 in the movable member 1060 is located in the positive X-direction away from the urging reference position and thus urged in the positive X-direction by the torsion spring 1067. The end face 1061C of the slider 1061 (refer to FIG. 24) is in contact with the side surface 1014C of the frame 1014 in the base 1010 (refer to FIG. 21). In this manner, the closing operation shown in FIG. 29 is complete. The resultant state is the closed state shown in FIG. 28A.

As described above, in the present embodiment, the bevel gear 1040, the double gear 1043, and the double gear 1046 mounted on the motor shaft of the motor 1030 are in engagement with the rack gear 1069 in the slider 1061 to form a gear mechanism for transmitting the rotation of the motor 1030 to the slider 1061. The double gears 1043 and 1046 in the present embodiment can reduce the rotation speed of the motor 1030. Such a gear mechanism is not limited to the illustrated example, and may include other power transmission elements combined together.

The blade driving device 1002 in the present embodiment moves the movable member 1060 in the positive X-direction (closing direction) through driving of the motor 1030 and covers the opening 1012 in the base 1010 with the blade 1062 in the movable member 1060, and moves the movable member 1060 in the negative X-direction (opening direction) through driving of the motor 1030 and uncovers the opening 1012 in the base 1010. As described above, the movable member 1060 in the blade driving device 1002 according to the present embodiment includes the knob 1063 as the operable member, which allows the user to directly move the blade 1062 in the positive X-direction (closing direction) or the negative X-direction (opening direction) from outside the electronic device 1001. In the blade driving device 1002 according to the present embodiment, the blade 1062 for covering the opening 1012 for the imaging device 1004 can be operated both through driving of the motor 1030 and a manual operation of the user.

In the above embodiment, as shown in FIG. 18, the base 1010 in the blade driving device 1002 is a portion of the housing (exterior) that is viewable from outside the electronic device 1001. The blade 1062 in the blade driving device 1002 is exposed outside the electronic device 1001. In other embodiments, the base 1010 may be accommodated and hidden in the housing of the electronic device 1001.

If, for example, the motor 1030 in the blade driving device 1002 malfunctions or is driven by a third party operation to uncover the opening 1012, the electronic device 1001 including the blade driving device 1002 allows the user to directly operate the blade 1062 to cover the opening 1012 with the blade 1062 from outside the electronic device 1001. This prevents unintended image capturing with the imaging device 1004. In particular, the electronic device 1001 connected to a network, such as the Internet, through a communication interface may be operated remotely by a malicious program without being noticed by the user. As described above, the opening 1012 for the imaging device 1004 can be covered with the blade 1062 by the user directly operating the blade 1062 from outside the electronic device 1001 for privacy protection of the user.

The sign (negative and positive) of the voltage applied to the motor 1030 and the rotation direction (forward direction and reverse direction) of the motor 1030 described above are mere examples in which the signs and the directions are each opposite to each other, and are interchangeable depending on each embodiment of the present invention.

Although the embodiments of the present invention have been described above, the present invention is not limited to the above embodiments and may be modified variously within the scope of its technical idea.

What is claimed is:

1. A blade driving device, comprising:
   a base with an opening for an imaging device;
   a movable member movable relative to the base in an opening direction and a closing direction opposite to the opening direction, the movable member including
      a slider held on the base in a manner movable in the opening direction and the closing direction,
      a blade connected to the slider, and
      an operable member that is located on a side of the base opposite to the slider and is operable to move the blade;
   a motor configured to move the movable member in the closing direction until the blade included in the movable member covers the opening in the base, and move the movable member in the opening direction until the blade included in the movable member uncovers the opening in the base; and
   a power transmission mechanism configured to transmit rotation of the motor to the slider included in the movable member to move the movable member.

2. The blade driving device according to claim 1, further comprising:
   an urging member configured to urge the movable member in the opening direction when the movable member is located in the opening direction away from an urging reference position, and urge the movable member in the closing direction when the movable member is located in the closing direction away from the urging reference position.

3. The blade driving device according to claim 1, wherein the power transmission mechanism includes
   a driving member movable in the opening direction and the closing direction,
   a gear mechanism configured to transmit rotation of the motor to the driving member to move the driving member, and
   a first engagement member located on the slider to engage with the driving member moved in the opening direction by the gear mechanism.

4. The blade driving device according to claim 1, wherein the power transmission mechanism includes
   a driving member movable in the opening direction and the closing direction,
   a gear mechanism configured to transmit rotation of the motor to the driving member to move the driving member, and
   a second engagement member located on the slider to engage with the driving member moved in the closing direction by the gear mechanism.

5. An electronic device, comprising:
   an imaging device including an image sensor; and
   the blade driving device according to claim 1,
   wherein external light enters the image sensor included in the imaging device through the opening in the base included in the blade driving device.

6. An electronic device, comprising:
   an imaging device including an image sensor;
   the blade driving device according to claim 1; and
   a controller configured to control driving of the motor included in the blade driving device,
   wherein external light enters the image sensor included in the imaging device through the opening in the base included in the blade driving device,
   the blade driving device includes a first sensor configured to detect the movable member moved by a predetermined distance in the opening direction, and the controller rotates the motor included in the blade driving device in a first direction to move the movable member in the opening direction, and stops the rotation of the motor in the first direction in response to the first sensor detecting the movable member moved by the predetermined distance in the opening direction.

7. An electronic device, comprising:
an imaging device including an image sensor;
the blade driving device according to claim 1; and
a controller configured to control driving of the motor included in the blade driving device,
wherein external light enters the image sensor included in the imaging device through the opening in the base included in the blade driving device,
the blade driving device includes a second sensor configured to detect the movable member moved by a predetermined distance in the closing direction, and
the controller rotates the motor included in the blade driving device in a second direction to move the movable member in the closing direction, and
stops the rotation of the motor in the second direction in response to the second sensor detecting the movable member moved by the predetermined distance in the closing direction.

8. An electronic device, comprising:
an imaging device including an image sensor;
the blade driving device according to claim 3; and
a controller configured to control driving of the motor included in the blade driving device,
wherein external light enters the image sensor included in the imaging device through the opening in the base included in the blade driving device,
the blade driving device includes
a first sensor configured to detect the movable member moved by a predetermined distance in the opening direction, and
a third sensor configured to detect the driving member at a predetermined standby position, and
the controller rotates the motor included in the blade driving device in a first direction to move the movable member in the opening direction with the driving member,
rotates the motor in a second direction opposite to the first direction to move the driving member in the closing direction in response to the first sensor detecting the movable member moved by the predetermined distance in the opening direction, and
stops the rotation of the motor in response to the third sensor detecting the driving member at the standby position.

9. An electronic device, comprising:
an imaging device including an image sensor;
the blade driving device according to claim 3; and
a controller configured to control driving of the motor included in the blade driving device,
wherein external light enters the image sensor included in the imaging device through the opening in the base included in the blade driving device,
the blade driving device includes
a second sensor configured to detect the movable member moved by a predetermined distance in the closing direction, and
a third sensor configured to detect the driving member at a predetermined standby position, and the controller rotates the motor included in the blade driving device in a second direction to move the movable member in the closing direction with the driving member,
rotates the motor in a first direction opposite to the second direction to move the driving member in the opening direction in response to the second sensor detecting the movable member moved by the predetermined distance in the closing direction, and
stops the rotation of the motor in response to the third sensor detecting the driving member at the standby position.

10. The electronic device according to claim 5, further comprising:
a communication interface for connection to a network.

11. A blade driving device according to claim 1, further comprising:
an urging member configured to urge the movable member in the opening direction when the movable member is located in the opening direction away from an urging reference position, and urge the movable member in the closing direction when the movable member is located in the closing direction away from the urging reference position, wherein
a power transmission mechanism includes a gear mechanism in engagement with the slider included in the movable member to transmit rotation of the motor to the movable member.

12. The blade driving device according to claim 11, wherein
the motor includes a motor shaft extending in the opening direction or the closing direction.

13. The blade driving device according to claim 12, wherein
the gear mechanism includes a bevel gear configured to translate rotation of the motor into motion in the opening direction or the closing direction.

14. The blade driving device according to claim 11, wherein
the gear mechanism includes a gear configured to reduce a rotation speed of the motor.

15. An electronic device, comprising:
an imaging device including an image sensor;
the blade driving device according to claim 11; and
a controller configured to control driving of the motor included in the blade driving device,
wherein external light enters the image sensor included in the imaging device through the opening in the base included in the blade driving device.

16. The electronic device according to claim 15, wherein
the blade driving device includes a first sensor configured to detect the movable member moved by a predetermined distance in the opening direction, and
the controller rotates the motor included in the blade driving device in a first direction to move the movable member in the opening direction, and
stops the rotation of the motor in the first direction in response to the first sensor detecting the movable member moved by the predetermined distance in the opening direction.

17. The electronic device according to claim 15, wherein
the blade driving device includes a second sensor configured to detect the movable member moved by a predetermined distance in the closing direction, and
the controller rotates the motor included in the blade driving device in a second direction to move the movable member in the closing direction, and stops the rotation of the motor in the second direction in response to the second sensor detecting the movable member moved by the predetermined distance in the closing direction.

18. The electronic device according to claim 15, further comprising:
a communication interface for connection to a network.

\* \* \* \* \*